United States Patent
Schondorf et al.

(10) Patent No.: US 11,295,026 B2
(45) Date of Patent: Apr. 5, 2022

(54) SCAN, DETECT, AND ALERT WHEN A USER TAKES A PHOTO OF A COMPUTER MONITOR WITH A MOBILE PHONE

(71) Applicant: Forcepoint, LLC, Austin, TX (US)

(72) Inventors: Yacov Schondorf, Kiryat Ono (IL); Michael Elazar, Ramat Gan (IL); Uri Elias, Ra'anana (IL); Gil Vinokoor, Hod Hasharon (IL)

(73) Assignee: Forcepoint, LLC, Austin, TX (US)

( * ) Notice: Subject to any disclaimer, the term of this patent is extended or adjusted under 35 U.S.C. 154(b) by 267 days.

(21) Appl. No.: 16/196,206

(22) Filed: Nov. 20, 2018

(65) Prior Publication Data

US 2020/0159937 A1    May 21, 2020

(51) Int. Cl.
  *H04L 29/06*   (2006.01)
  *G06F 21/60*   (2013.01)
  *G06F 21/62*   (2013.01)

(52) U.S. Cl.
  CPC ........ *G06F 21/604* (2013.01); *G06F 21/6245* (2013.01)

(58) Field of Classification Search
  CPC .... G06F 21/604; G06F 21/6245; G06F 21/00; G06F 21/316; G06F 21/554; G06F 21/6218; G06F 21/32; G06N 20/00
  See application file for complete search history.

(56) References Cited

U.S. PATENT DOCUMENTS

| | | | |
|---|---|---|---|
| 6,907,531 B1 | 6/2005 | Dodd et al. | |
| 7,574,740 B1 | 8/2009 | Kennis | |
| 7,882,538 B1 | 2/2011 | Palmer | |
| 8,230,505 B1 | 7/2012 | Ahrens et al. | |
| 9,355,236 B1* | 5/2016 | Kratz | ........... G06F 21/31 |
| 10,326,735 B2 | 6/2019 | Jakobsson et al. | |
| 2002/0078382 A1 | 6/2002 | Sheikh et al. | |
| 2003/0145225 A1 | 7/2003 | Bruton et al. | |
| 2003/0145226 A1 | 7/2003 | Bruton et al. | |
| 2003/0188189 A1 | 10/2003 | Desai et al. | |
| 2005/0138402 A1 | 6/2005 | Yoon et al. | |
| 2005/0171954 A1 | 8/2005 | Hull et al. | |
| 2006/0085543 A1 | 4/2006 | Hrastar et al. | |
| 2006/0117172 A1* | 6/2006 | Zhang | ........... G06F 9/4416 713/2 |
| 2008/0082722 A1 | 4/2008 | Savagaonkar et al. | |
| 2009/0249466 A1 | 10/2009 | Motil et al. | |
| 2009/0254572 A1 | 10/2009 | Redlich et al. | |
| 2010/0010968 A1 | 1/2010 | Redlich et al. | |

(Continued)

OTHER PUBLICATIONS

Caltech, Computational Vision at Caltech, downloaded Oct. 25, 2018.

(Continued)

*Primary Examiner* — Sarah Su

(74) *Attorney, Agent, or Firm* — Terrile, Cannatti & Chambers; Stephen A. Terrile

(57) ABSTRACT

A method, system and computer-usable medium for detecting an occurrence of visual hacking via a visual hacking detection operation which includes: receiving a surveillance image; processing the surveillance image to generate surveillance image data; and, performing a visual hacking detection operation using the surveillance image data, the visual hacking detection operation determining whether visual hacking has been detected.

14 Claims, 11 Drawing Sheets

(56) References Cited

U.S. PATENT DOCUMENTS

| | | | |
|---|---|---|---|
| 2010/0205667 A1* | 8/2010 | Anderson | G06F 21/62 |
| | | | 726/19 |
| 2013/0080641 A1 | 3/2013 | Lui et al. | |
| 2013/0124644 A1 | 5/2013 | Hunt et al. | |
| 2013/0231084 A1 | 9/2013 | Raleigh | |
| 2013/0269029 A1 | 10/2013 | Nakawatase et al. | |
| 2013/0275574 A1 | 10/2013 | Hugard, IV et al. | |
| 2013/0298192 A1 | 11/2013 | Kumar et al. | |
| 2014/0082726 A1 | 3/2014 | Dreller et al. | |
| 2014/0198958 A1* | 7/2014 | Nathan | G06F 21/6245 |
| | | | 382/116 |
| 2014/0201844 A1* | 7/2014 | Buck | G06F 21/554 |
| | | | 726/26 |
| 2014/0298468 A1 | 10/2014 | Tamamura et al. | |
| 2014/0379812 A1 | 12/2014 | Bastide et al. | |
| 2015/0066896 A1 | 3/2015 | Davis et al. | |
| 2015/0261969 A1* | 9/2015 | Frost | H04N 1/00859 |
| | | | 726/30 |
| 2015/0264049 A1 | 9/2015 | Achilles et al. | |
| 2015/0288714 A1 | 10/2015 | Emigh et al. | |
| 2016/0042179 A1 | 2/2016 | Weingarten et al. | |
| 2016/0055334 A1 | 2/2016 | Herwono et al. | |
| 2016/0148019 A1* | 5/2016 | Rambler | H04N 1/00872 |
| | | | 726/26 |
| 2017/0126718 A1 | 5/2017 | Baradaran et al. | |
| 2017/0149795 A1 | 5/2017 | Day, II | |
| 2017/0169249 A1* | 6/2017 | de Oliveira | H04L 67/10 |
| 2017/0214705 A1 | 7/2017 | Gupta | |
| 2017/0244729 A1 | 8/2017 | Fahrny et al. | |
| 2017/0302822 A1* | 10/2017 | Vandeweerd | H04N 1/444 |
| 2017/0329966 A1* | 11/2017 | Koganti | H04L 63/1433 |
| 2018/0152471 A1 | 5/2018 | Jakobsson | |
| 2018/0174138 A1 | 6/2018 | Subbarayan et al. | |
| 2018/0234368 A1 | 8/2018 | Everton | |
| 2019/0034625 A1* | 1/2019 | Ford | G06F 21/602 |
| 2019/0124117 A1* | 4/2019 | Swafford | G06F 21/552 |
| 2019/0124118 A1* | 4/2019 | Swafford | H04L 67/141 |
| 2019/0199745 A1 | 6/2019 | Jakobsson et al. | |
| 2019/0213401 A1 | 7/2019 | Kuang | |
| 2019/0370851 A1 | 12/2019 | Haddadnia | |
| 2020/0074481 A1 | 3/2020 | Zhang | |
| 2020/0134192 A1* | 4/2020 | Gupta | G06F 8/65 |
| 2020/0234243 A1* | 7/2020 | Miron | H04L 63/20 |
| 2020/0242260 A1* | 7/2020 | Chen | G06F 21/62 |
| 2020/0257821 A1* | 8/2020 | Lai | G06F 21/6245 |
| 2020/0257822 A1* | 8/2020 | Ford | G06F 21/84 |
| 2020/0257823 A1* | 8/2020 | Ford | H04L 63/1425 |

OTHER PUBLICATIONS

Chapter 12: Classification with Caltech 101, version 1.3.8, published Oct. 2018.
Larry Ponemon, How One Smart Phone Picture Can Take Down Your Company, RSA Conference 2015.
Information Security Stack Exchange, Is it possible to prevent unauthorized copying or recording of data by photographing screens? downloaded Oct. 25, 2018.
Spiceworks, Prevent Photos being taken of computer screen, downloaded Oct. 25, 2018.
Charlie Sorrel, Wired.com, Russian billionaire installs anti-photo shield on giant yacht, Sep. 21, 2009.
Wikipedia, Analog hole, downloaded Oct. 25, 2018.
symantec.com, Which tuning is available for improving the performance of Symantec Endpoint Protection clients during scan, https://support.symantec.com/en_US/article.TECH143941.html, Jan. 6, 2011.
microsoft.com, Windows Search Overview, https://msdn.microsoft.com/en-us/library/windows/desktop/aa965362, printed Nov. 20, 2017.
Stephen G. Dimmock et al., Is Fraud Contagious? Co-Worker Influence on Misconduct by Financial Advisers, The Journal of Finance, first published online Feb. 3, 2018.
Thomas R. Hurd et al., A framework for analyzing contagion in assortative banking networks, PLoS ONE 12(2): e0170579, 2017.
Sans Isc InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike +Domains/22310/.

* cited by examiner

SCAN, DETECT, AND ALERT WHEN A USER TAKES A PHOTO OF A COMPUTER MONITOR WITH A MOBILE PHONE

BACKGROUND OF THE INVENTION

Field of the Invention

The present invention relates in general to the field of computers and similar technologies, and in particular to software utilized in this field. Still more particularly, it relates to a method, system and computer-usable medium for detecting an occurrence of visual hacking.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

SUMMARY OF THE INVENTION

A method, system and computer-usable medium are disclosed for detecting an occurrence of visual hacking.

More specifically, in one embodiment the invention relates to a method for detecting visual hacking comprising: receiving a surveillance image; processing the surveillance image to generate surveillance image data; and, performing a visual hacking detection operation using the surveillance image data, the visual hacking detection operation determining whether visual hacking has been detected.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving a surveillance image; processing the surveillance image to generate surveillance image data; and, performing a visual hacking detection operation using the surveillance image data, the visual hacking detection operation determining whether visual hacking has been detected.

In another embodiment the invention relates to a computer-readable storage medium embodying computer program code, the computer program code comprising computer executable instructions configured for: receiving a surveillance image; processing the surveillance image to generate surveillance image data; and, performing a visual hacking detection operation using the surveillance image data, the visual hacking detection operation determining whether visual hacking has been detected.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
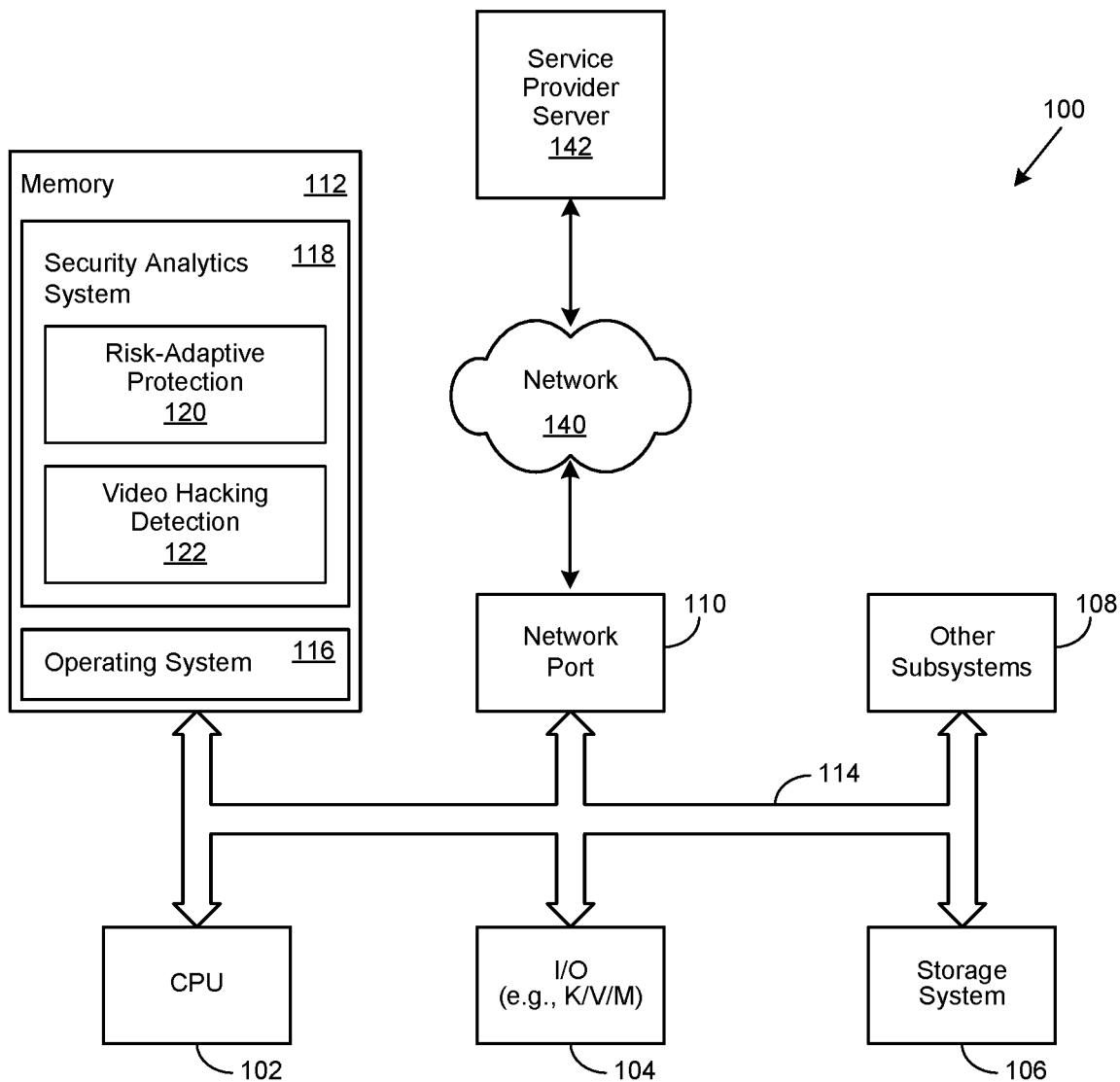
FIG. 1 depicts an exemplary client computer in which the present invention may be implemented.

A method, system and computer-usable medium are disclosed for detecting an occurrence of visual hacking. Certain aspects of the invention include an appreciation that various approaches are known for protecting digital assets. Certain aspects of the invention likewise include an appreciation it is possible to use a camera or video recorder to capture an image of various types of digital assets once they are displayed within a UI. Likewise, certain aspects of the invention include an appreciation that such an approach, typically referred to as a form of "visual hacking," can result in a security vulnerability. In particular, images of sensitive, confidential or private information may be captured or otherwise recorded for unauthorized use without the knowledge of its authorized user or owner.

Certain aspects of the invention include an appreciation that visual hacking is a weak point in a pipeline of data, whether it is at rest, in motion, or in use. Certain aspects of the invention likewise include an appreciation that visual hacking is a threat vector that is virtually untraceable. As an example, practically every mobile phone, tablet computer, and smart watch currently manufactured has an integrated digital camera that can be used to illicitly record high-resolution images of data displayed within a UI. Furthermore, it is becoming increasingly common for employees to use their own mobile phones and other devices for work use. Moreover, it is oftentimes difficult to control their use within a work environment. While mandates may be enacted prohibiting their use, actual enforcement can prove problematic. Consequently, the use of such mobile devices can pose a significant data exfiltration threat.

Certain aspects of the invention include an appreciation that visual hacking can be a gateway to a major data breach or a large-scale attack. As an example, a visual hacker may capture images of a contact list or directory of an organization, confidential information about customers (e.g., products purchased and associated amounts spent), or sensitive information about employees (e.g., Social Security numbers). Likewise, images may be captured of various user's login credentials (e.g., user ID/passwords), accounting information (e.g., financial status, budgeting projections, etc.), or confidential documents (e.g., internal memos). Other images that may be captured include photos and videos containing various business information, internal presentations, or attorney-client privilege documents. Consequently, the information captured in such images can then be used for phishing and social engineering attacks, identity theft and fraud, cyber extortion, and economic espionage.

Various aspects of the invention include an appreciation that certain studies have shown the amount of time needed to commit visual hacking is typically less than 15 minutes for almost half of all occurrences, and less than a half-hour in general. Furthermore, these same studies show that a visual hacker was not stopped by fellow employees in 70% of such incidences, even when a mobile device was being used to take a picture of data displayed within a UI. In addition, an average of five items of confidential information was captured during each incident. Moreover, even in cases where the visual hacker was apprehended, an average of 2.8 items of confidential information was obtained per incident.

Certain embodiments of the invention include an appreciation that visual hacking is an under-addressed security risk with potentially detrimental consequences. Likewise, certain embodiments of the invention include an appreciation that a hacker often needs only one item of valuable information to make a large-scale data breach feasible. Consequently, low-tech threats such as visual hacking can be just as detrimental to an organization as known high-tech threats.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to detect an occurrence of visual hacking. In certain embodiments, the security analytics system 118 may include a risk-adaptive protection 120 module and a visual hacking detection 122 module. In certain embodiments, the security analytics system 118 may be implemented to detect an occurrence of visual hacking. In certain embodiments, the risk-adaptive protection 120 module and the visual hacking detection 122 module may be implemented to detect the use of a camera to record an image of information displayed within a user interface (UI) and adaptively respond to mitigate risk.

Figure 2:
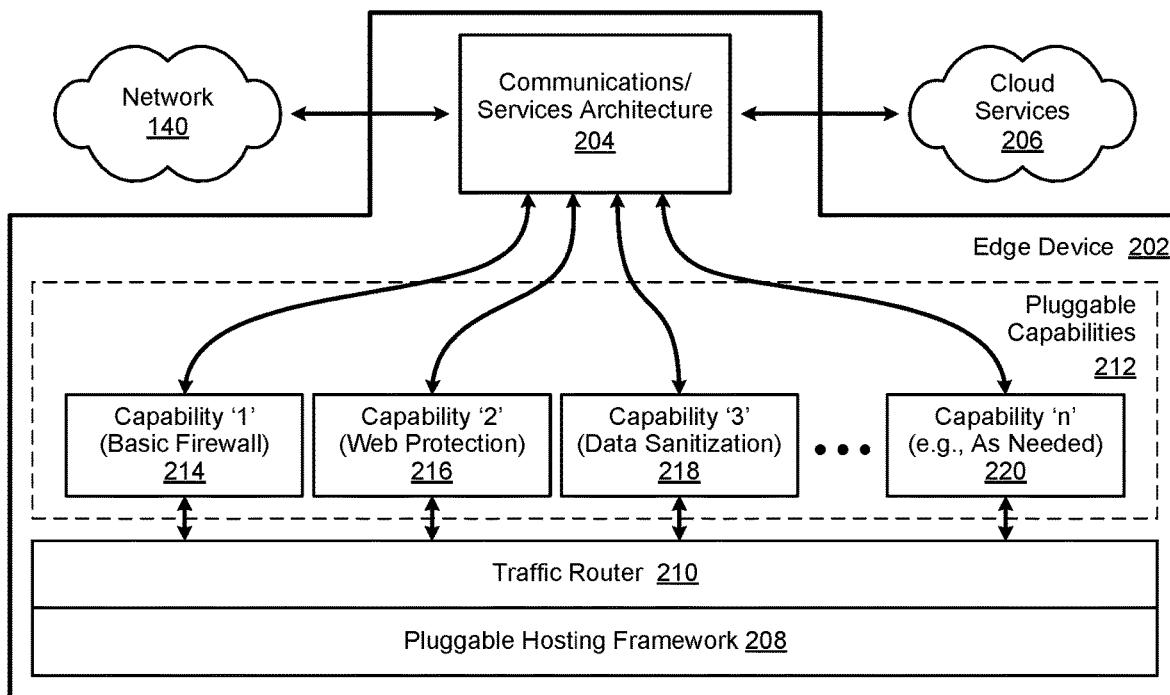
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
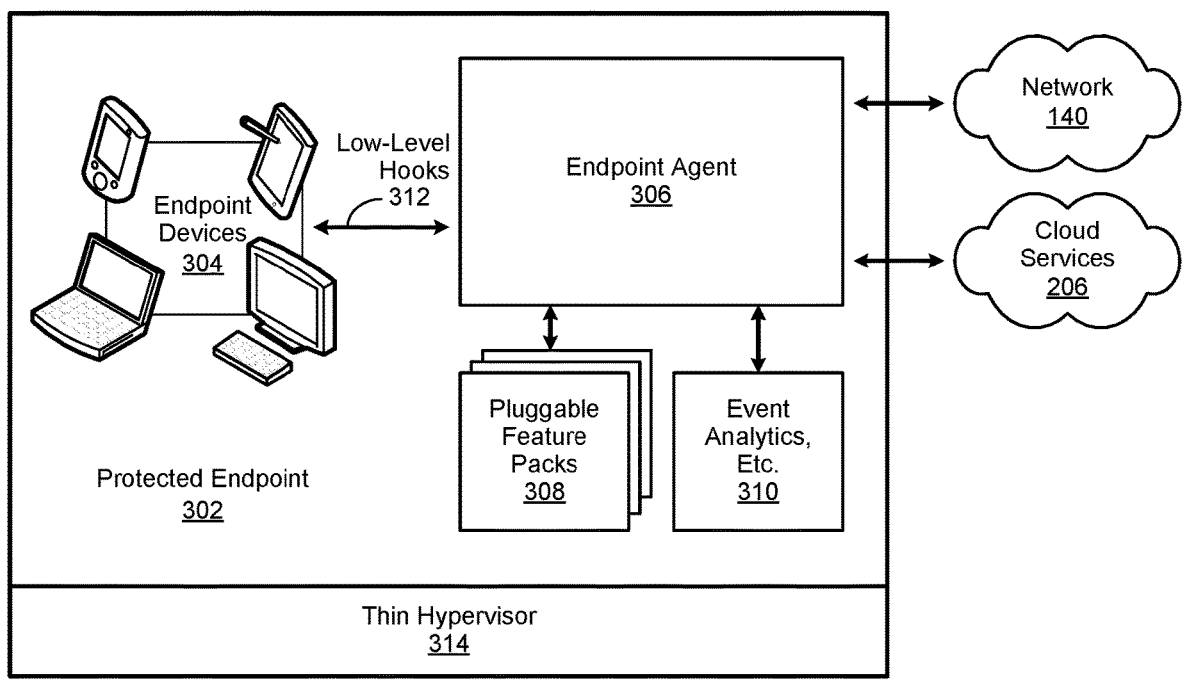
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information handling system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
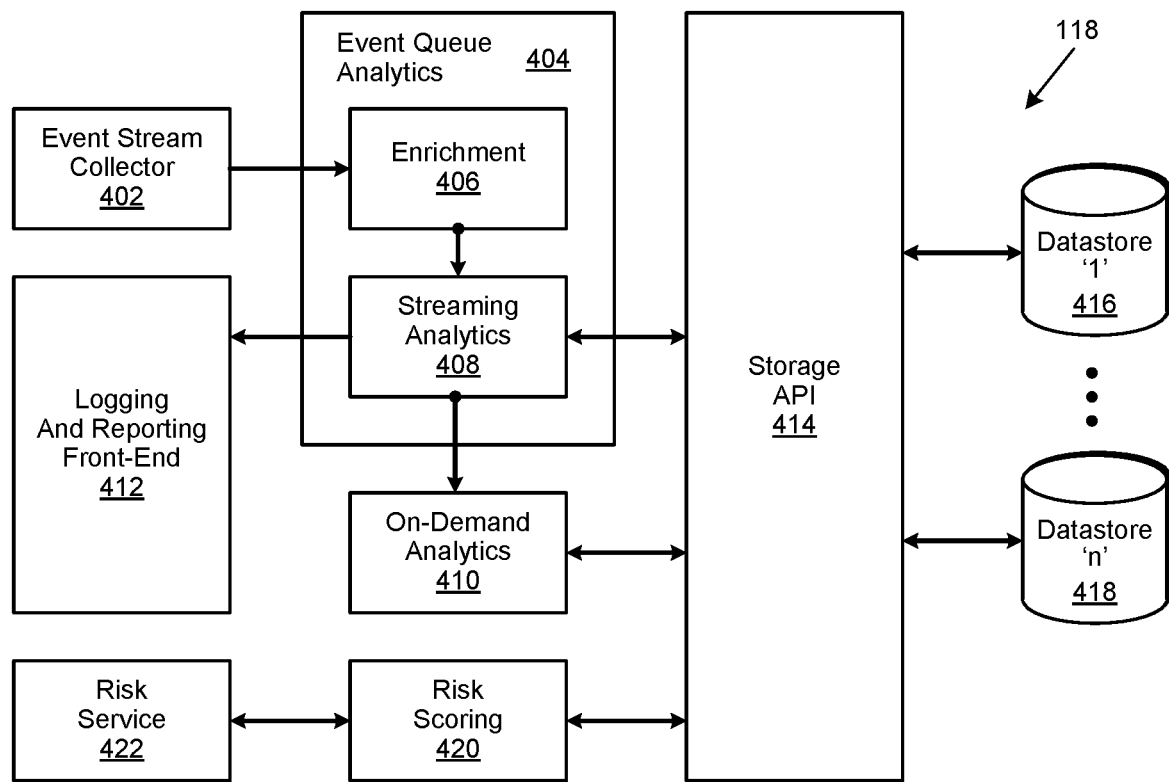
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various user behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 406 to a streaming 408 analytics module. In turn, the streaming 408 analytics module may provide some or all of the enriched user behavior information to an on-demand 410 analytics module. As used herein, streaming 408 analytics broadly refers to analytics performed in near real-time on enriched user behavior information as it is received. Likewise, on-demand 410 analytics broadly refers herein to analytics performed, as they are requested, on enriched user behavior information after it has been received. In certain embodiments, the enriched user behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched user behavior associated with a particular interval of, or point in, time. In certain embodiments, the streaming 408 or on-demand 410 analytics may be performed on enriched user behavior associated with a particular user, group of users, one or more entities, or a combination thereof. In certain embodiments, the streaming 408 or on-demand 410 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 414 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing a user profile, as described in greater detail herein. In certain embodiments, the risk management service 422 may be implemented to perform operations associated with detecting anomalous, abnormal, unexpected or malicious user behavior and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 416 through 'n' 418. Skilled practitioners of the art will recognize that many such embodiments are possible. Accordingly, the foregoing is not intended to limit the spirit, scope or intent of the invention.

Figure 5:
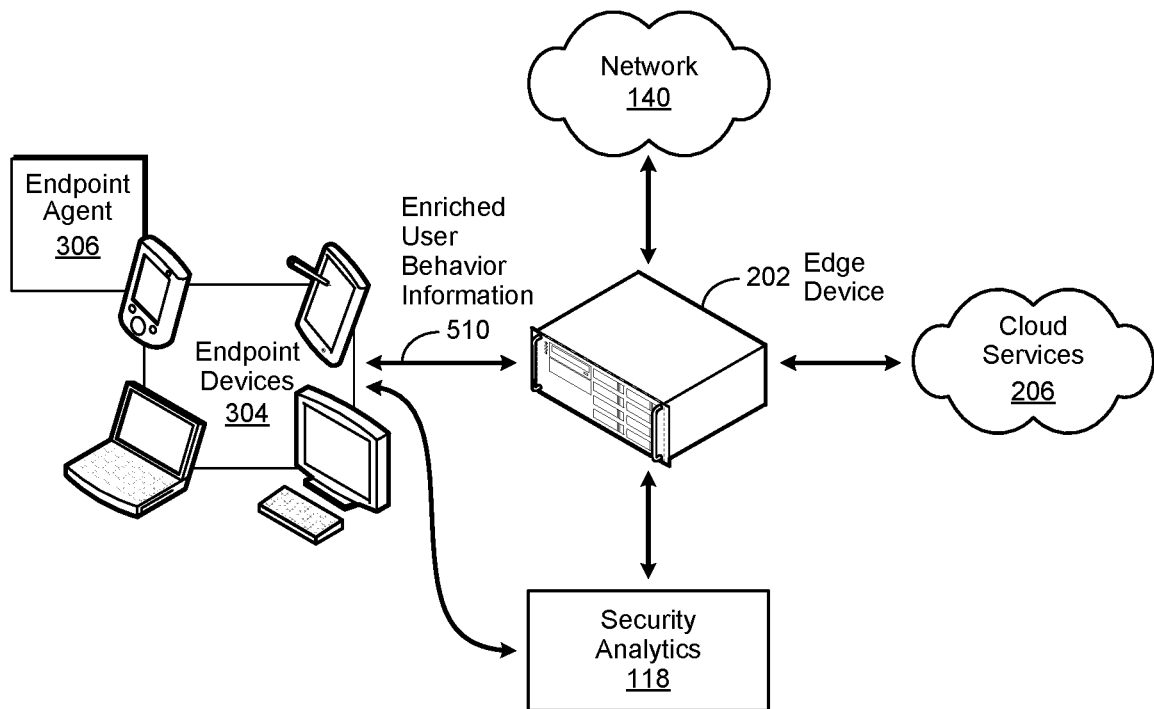
FIG. 5 is a simplified block diagram of a security analytics system.

FIG. 5 is a simplified block diagram of the operation of a security analytics system implemented in accordance with an embodiment of the invention. In certain embodiments, the security analytics system 118 may be implemented to perform operations associated with detecting anomalous, abnormal, unexpected or malicious user behavior, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain user behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6A:
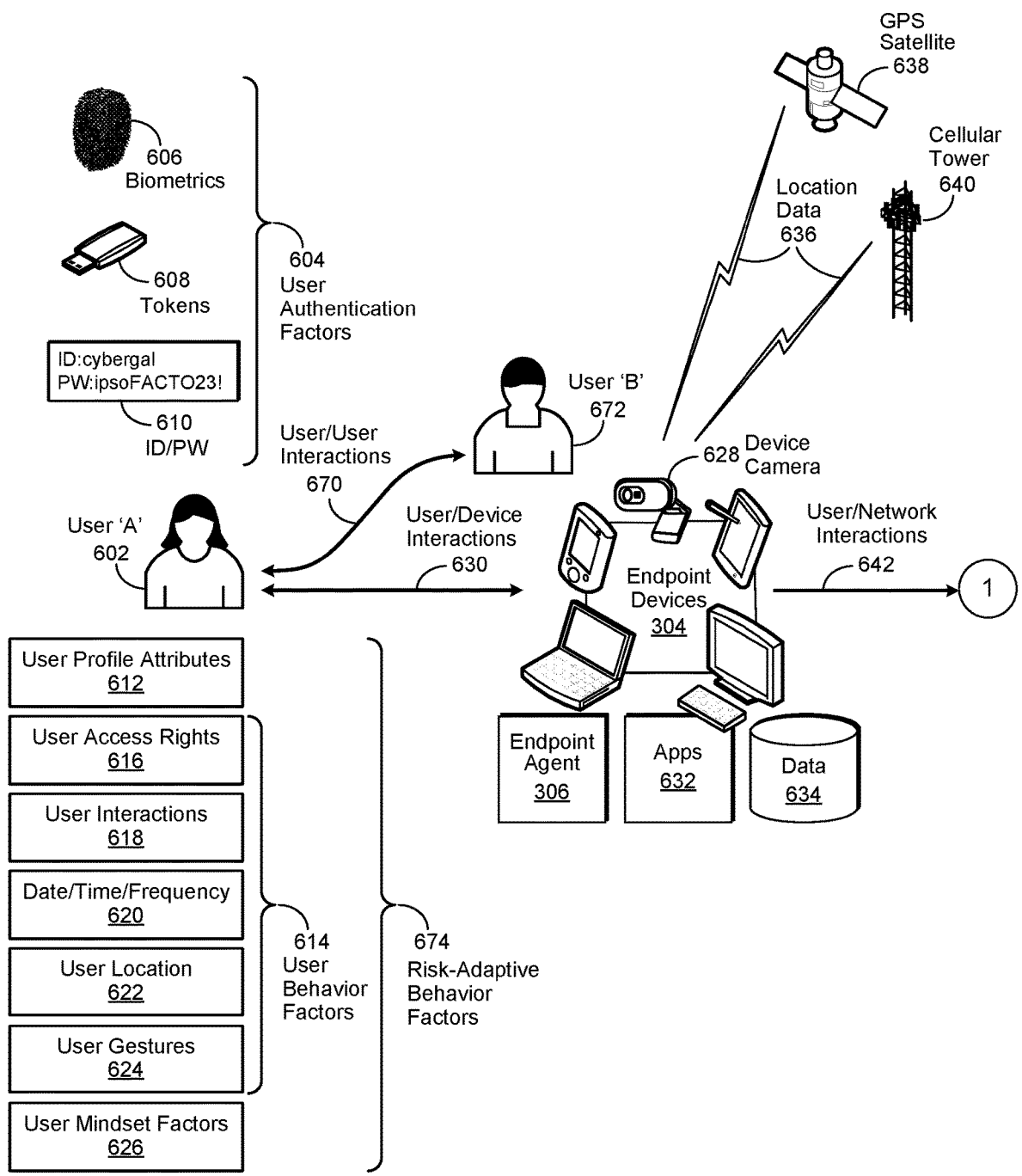
FIGS. 6a and 6b show a block diagram of a security analytics system environment.
Figure 6B:
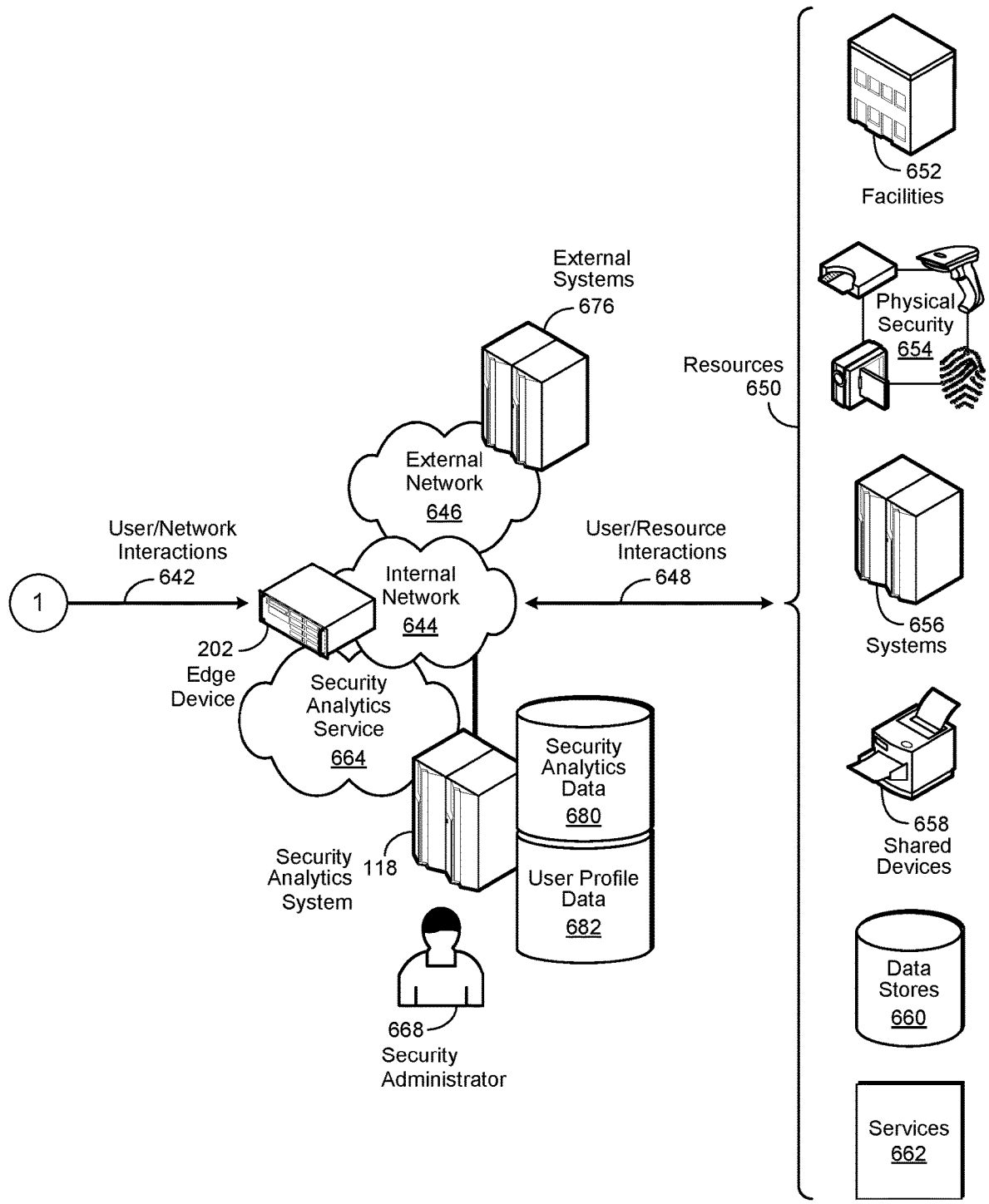

FIGS. 6a and 6b show a block diagram of a security analytics environment implemented in accordance with an embodiment of the invention. In certain embodiments, analyses performed by a security analytics system 118 may be used to identify anomalous, abnormal, unexpected or malicious behavior associated with an entity. In certain embodiments, the anomalous, abnormal, unexpected or malicious behavior may be identified at a particular point in time, during the occurrence of an event, the enactment of a user behavior, or a combination thereof.

As used herein, an entity broadly refers to something that exists as itself, whether physically or abstractly. In certain embodiments, an entity may be an individual user, a group, an organization, or a government. In certain embodiments, an entity may likewise be an item, a device, such as endpoint 304 and edge 202 devices, a network, such as an internal 644 and external 646 networks, a domain, an operation, or a process. In certain embodiments, an entity may be a resource 650, such as a geographical location or formation, a physical facility 652, such as a venue, various physical security devices 654, a system 656, shared devices 658, such as printer, scanner, or copier, a data store 660, or a service 662, such as a service 662 operating in a cloud environment.

As likewise used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

In certain embodiments, information associated with such user behavior may be stored in a user profile. As used herein, a user profile broadly refers to a collection of information that uniquely describes a user's identity and their associated behavior, whether the behavior occurs within a physical realm or cyberspace. In certain embodiments, the user profile may be stored in a repository of user profile data 682. In certain embodiments, as described in greater detail herein, the user profile may include user profile attributes 612, user behavior factors 614, user mindset factors 626, or a combination thereof.

As used herein, a user profile attribute 612 broadly refers to data or metadata that can be used, individually or in combination with other user profile attributes 612, to uniquely ascertain the identity of an entity. In certain embodiments, the user profile attributes 612 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, financial account information, such as credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604.

In certain embodiments, the user authentication factors 604 may be used to authenticate the identity of a user, such as user 'A' 602 or 'B' 672. In certain embodiments, the user authentication factors 604 may be used to ensure that a particular user, such as user 'A' 602 or 'B' 672, is associated with their corresponding user profile, rather than a user profile associated with another user. In certain embodiments, the user authentication factors 604 may include a user's biometrics 606 (e.g., a fingerprint or retinal scan), tokens 608 (e.g., a dongle containing cryptographic keys), user identifiers and passwords (ID/PW) 610, and personal identification numbers (PINs). In certain embodiments, the user's biometrics 606 may include certain facial features corresponding to a particular user, such as user 'A' 602 of 'B' 672. In certain embodiments, such facial features may be captured through the implementation of a device camera 628, and subsequently processed for facial recognition, as described in greater detail herein.

As used herein, a user behavior factor 614 broadly refers to information associated with a user's behavior, whether the behavior occurs within a physical realm or cyberspace. In certain embodiments, the user behavior factors 614 may include the user's access rights 616, the user's interactions 618, and the date/time/frequency 620 of those interactions 618. In certain embodiments, the user behavior factors 614 may likewise include the user's location 622 when the interactions 618 are enacted, and the user gestures 624 used to enact the interactions 618.

In certain embodiments, the user gestures 624 may include key strokes on a keypad, a cursor movement, a mouse movement or click, a finger swipe, tap, or other hand gesture, an eye movement, or some combination thereof. In certain embodiments, the user gestures 624 may likewise include the cadence of the user's keystrokes, the motion, force and duration of a hand or finger gesture, the rapidity and direction of various eye movements, or some combination thereof. In certain embodiments, the user gestures 624 may include various audio or verbal commands performed by the user.

In various embodiments, certain date/time/frequency 620 user behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 626, or a combination thereof, to one or more instants in time. As an example, user 'A' 602 may access a particular system 656 to download a customer list at 3:47 PM on Nov. 3, 2017. Analysis of their user behavior profile indicates that it is not unusual for user 'A' 602 to download the customer list on a weekly basis. However, examination of their user behavior profile also indicates that user 'A' 602 forwarded the downloaded customer list in an email message to user 'B' 672 at 3:49 PM that same day. Furthermore, there is no record in their user behavior profile that user 'A' 602 has ever communicated with user 'B' 672 in the past. Moreover, it may be determined that user 'B' 672 is employed by a competitor.

Accordingly, the correlation of user 'A' 602 downloading the customer list at one point in time, and then forwarding the customer list to user 'B' 672 at a second point in time shortly thereafter, is an example of societal time.

In a variation of the prior example, user 'A' 602 may download the customer list at 3:47 PM on Nov. 3, 2017. However, instead of immediately forwarding the customer list to user 'B' 672, user 'A' 602 leaves for a two week vacation. Upon their return, they forward the previously-downloaded customer list to user 'B' 672 at 9:14 AM on Nov. 20, 2017. From an ontological time perspective, it has been two weeks since user 'A' 602 accessed the system 656 to download the customer list. However, from a societal time perspective, they have still forwarded the customer list to user 'B' 672, despite two weeks having elapsed since the customer list was originally downloaded.

Accordingly, the correlation of user 'A' 602 downloading the customer list at one point in time, and then forwarding the customer list to user 'B' 672 at a much later point in time, is another example of societal time. More particularly, it may be inferred that the intent of user 'A' 602 did not change during the two weeks they were on vacation. Furthermore, user 'A' 602 may have attempted to mask an intended malicious act by letting some period of time elapse between the time they originally downloaded the customer list and when they eventually forwarded it to user 'B' 672. From the foregoing, those of skill in the art will recognize that the use of societal time may be advantageous in determining whether a particular user behavior is acceptable, anomalous, abnormal, unexpected or malicious.

As used herein, mindset factors 626 broadly refer to information used to determine the mental state of a user at a particular point in time, during the occurrence of an event, an enactment of a user behavior, or combination thereof. As used herein, mental state broadly refers to a hypothetical state corresponding to the way a user may be thinking or feeling. In certain embodiments, the user mindset factors 626 may include a personality type. Examples of known approaches for determining a personality type include Jungian types, Myers-Briggs type indicators, Keirsy Temperament Sorter, Socionics, Enneagram of Personality, and Eyseneck's three-factor model.

In certain embodiments, the mindset factors 626 may include various behavioral biometrics. As likewise used herein, a behavioral biometric broadly refers to a physiological indication of a user's mental state. Examples of behavioral biometrics may include a user's blood pressure, heart rate, respiratory rate, eye movements and iris dilation, facial expressions, body language, tone and pitch of voice, speech patterns, facial expressions, and so forth.

In certain embodiments, the security analytics system 118 may be implemented to process certain entity information associated with providing resolution of the identity of an entity at a particular point in time. As likewise used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain entity identifier types or classifications.

In various embodiments, the security analytics system 118 may be implemented to use certain entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors 604, user profile attributes 612, location data 636, information associated with various endpoint 304 and edge 202 devices, internal 644 and external 646 networks, resource entities 650, or a combination thereof.

In certain embodiments, the entity identifier information may include temporal information. As used herein, temporal information broadly refers to a measure of time (e.g., a date, timestamp, etc.), a measure of a duration of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device 304, accessing a system 656, interacting with a physical security device 645 or shared devices 658, and entering a physical facility 652. Other examples of temporal events include uploading, transferring, downloading, modifying, or deleting data, such as data stored in a datastore 660, or accessing a service 662. Yet other examples of temporal events include user/user 670 interactions between two or more users, user/device 630 interactions between a user and a device, user/network 642 interactions between a user and a network, and user/resource 648 interactions between a user and a resource 650, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the security analytics system 118 may be implemented to use information associated with such temporal resolution of an entity's identity to assess the risk associated with a particular entity, at a particular point in time, and adaptively respond with an associated response. In certain embodiments, the security analytics system 118 may be implemented to respond to such assessments in order to reduce operational overhead and improve system efficiency while maintaining security integrity. In certain embodiments, the response to such assessments may be performed by a security administrator 668. Accordingly, certain embodiments of the invention may be directed towards assessing the risk associated with the affirmative resolution of the identity of an entity at a particular point in time in combination with its associated contextual information. Consequently, the security analytics system 118 may be more oriented in various embodiments to risk adaptation than to security administration.

In certain embodiments, the security analytics system 118 may be implemented to use information associated with certain user behavior elements to resolve the identity of an entity at a particular point in time. A user behavior element, as used herein, broadly refers to a discrete element of a user's behavior during the performance of a particular operation in a physical realm, cyberspace, or a combination thereof. In certain embodiments, such user behavior elements may be associated with a user/device 630, a user/network 642, a user/resource 648, a user/user 660 interaction, or a combination thereof.

As an example, user 'A' 602 may use an endpoint device 304 to browse a particular web page on a news site on the Internet. In this example, the individual actions performed by user 'A' 602 to access the web page are user behavior elements that constitute a user behavior. As another example, user 'A' 602 may use an endpoint device 304 to download a data file from a particular system 656. In this example, the individual actions performed by user 'A' 602 to download the data file, including the use of one or more user authentication factors 604 for user authentication, are user behavior elements that constitute a user behavior. In certain embodiments, the user/device 630 interactions may include an interaction between a user, such as user 'A' 602 or 'B' 672, and an endpoint device 304.

In certain embodiments, the user/device 630 interaction may include interaction with an endpoint device 304 that is not connected to a network at the time the interaction occurs. As an example, user 'A' 602 or 'B' 672 may interact with an endpoint device 304 that is offline, using applications 632, accessing data 634, or a combination thereof, it may contain. Those user/device 630 interactions, or their result, may be stored on the endpoint device 304 and then be accessed or retrieved at a later time once the endpoint device 304 is connected to the internal 644 or external 646 networks. In certain embodiments, an endpoint agent 306 may be implemented to store the user/device 630 interactions when the user device 304 is offline.

In certain embodiments, an endpoint device 304 may be implemented with a device camera 628. In certain embodiments, the device camera 628 may be integrated into the endpoint device. In certain embodiments, the device camera 628 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 628 may be implemented to capture provide user/device 630 interaction information to an endpoint agent 306. In various embodiments, the device camera 628 may be implemented to provide surveillance information related to certain user/device 630 or user/user 670 interactions. In certain embodiments, the surveillance information may be used by the security analytics system 118 to detect anomalous, abnormal, unexpected or malicious behavior associated with an entity, such as user 'A' 602 or user 'B' 672. In certain embodiments, the entity may or may not be aware that the device camera 628 is providing such surveillance information. As an example, a visual indicator associated with the device camera 628, such as a "record" light, may or may not be activated when it is recording surveillance images.

In certain embodiments, the endpoint device 304 may be used to communicate data through the use of an internal network 644, an external network 646, or a combination thereof. In certain embodiments, the internal 644 and the external 646 networks may include a public network, such as the Internet, a physical private network, a virtual private network (VPN), or any combination thereof. In certain embodiments, the internal 644 and external 646 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 670 interactions may include interactions between two or more users, such as user 'A' 602 and 'B' 662. In certain embodiments, the user/user interactions 670 may be physical, such as a face-to-face meeting, via a user/device 630 interaction, a user/network 642 interaction, a user/resource 648 interaction, or some combination thereof. In certain embodiments, the user/user 670 interaction may include a face-to-face verbal exchange. In certain embodiments, the user/user 670 interaction may include a written exchange, such as text written on a sheet of paper. In certain embodiments, the user/user 670 interaction may include a face-to-face exchange of gestures, such as a sign language exchange.

In certain embodiments, temporal event information associated with various user/device 630, user/network 642, user/resource 648, or user/user 670 interactions may be collected and used to provide real-time resolution of the identity of an entity at a particular point in time. Those of skill in the art will recognize that many such examples of user/device 630, user/network 642, user/resource 648, and user/user 660 interactions are possible. Accordingly, the foregoing is not intended to limit the spirit, scope or intent of the invention.

In various embodiments, the security analytics system 118 may be implemented to process certain contextual information in the performance of certain security analytic operations.

As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

In certain embodiments, the contextual information may include location data 636. In certain embodiments, the endpoint device 304 may be configured to receive such location data 636, which is used as a data source for determining the user's location 622. In certain embodiments, the location data 636 may include Global Positioning System (GPS) data provided by a GPS satellite 638. In certain embodiments, the location data 636 may include location data 636 provided by a wireless network, such as from a cellular network tower 640. In certain embodiments (not shown), the location data 636 may include various Internet Protocol (IP) or other network address information assigned to the endpoint 304 or edge 202 device. In certain embodiments (also not shown), the location data 636 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 652, physical security device 654, system 656, or shared device 658. As an example, the endpoint device 304 may be directly connected to an ingress/egress system, such as an electronic lock on a door or an access gate of a parking garage. As another example, the endpoint device 304 may be indirectly connected to a physical security device 654 through a dedicated security network.

In certain embodiments, the security analytics system 118 may be implemented to perform various risk-adaptive protection operations. Risk-adaptive, as used herein, broadly refers to adaptively responding to a risk associated with an electronically-observable user behavior. In various embodiments, the security analytics system 118 may be implemented to perform certain risk-adaptive protection operations by monitoring certain user behaviors, assess the corresponding risk they may represent, individually or in combination, and respond with an associated response. In certain embodiments, such responses may be based upon contextual information, described in greater detail herein, associated with a given user behavior.

In certain embodiments, various risk-adaptive behavior factors 674, likewise described in greater detail herein, may be used to perform the risk-adaptive protection operations. In certain embodiments, the risk-adaptive behavior factors 674 may include user profile attributes 612, user behavior factors 614, user mindset factors 626, or a combination thereof. In these embodiments, the risk-adaptive behavior factors 674 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 664. In certain embodiments, the security analytics service 664 may be implemented in a cloud environment familiar to those of skill in the art. In various embodiments, the security analytics system 118 may use data stored in a repository of security analytics data 680 in the performance of certain security analytics operations, described in greater detail herein. Those of skill in the art will recognize that many such embodiments are possible. Accordingly, the foregoing is not intended to limit the spirit, scope or intent of the invention.

Figure 7:
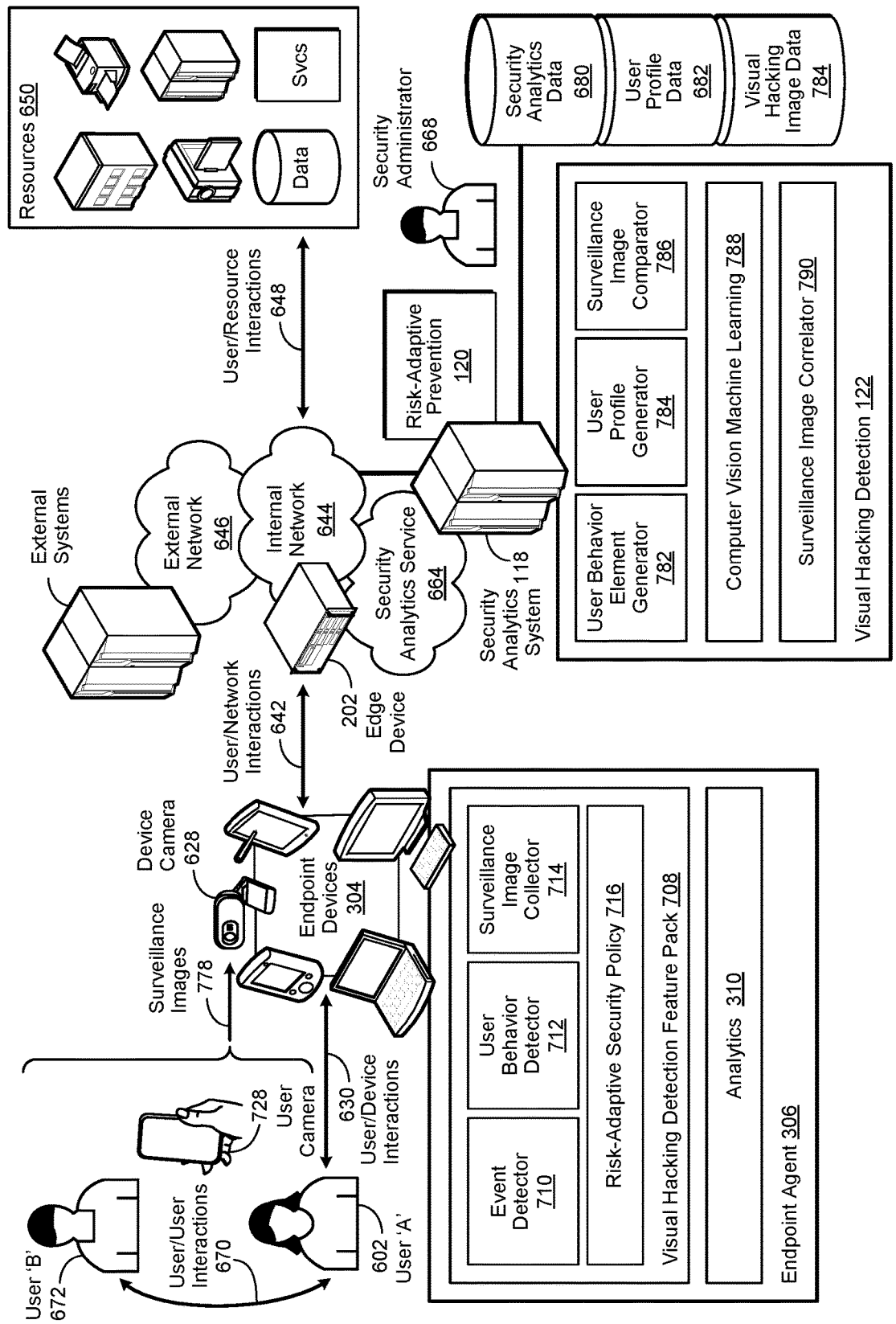
FIG. 7 is a functional block diagram of a security analytics system implemented to detect the occurrence of visual hacking.

FIG. 7 is a functional block diagram of a security analytics system implemented in accordance with an embodiment of the invention to detect the occurrence of visual hacking. As used herein, visual hacking broadly refers to an act of collecting confidential information by visual means. In certain embodiments, the confidential information may include sensitive personal information (SPI), described in greater detail herein. As an example, an attacker may simply look at the screens of nearby mobile devices, such as a smart phone, tablet, or laptop, or the monitor of a desktop computer or other device, to gather information about their user or owner.

Alternatively, the attacker might also watch a user's interaction with a keyboard or key pad to discern their user ID and password information. Afterwards, such information may be used to mount a brute-force attack to hack or crack various accounts associated with the victim. As another example, the attacker might make a video or take photos of a user's screen or keyboard interactions using a user camera 728, such as a camera integrated into a mobile device. Skilled practitioners of the art will recognize that many such examples of visual hacking are possible. Accordingly, the foregoing is not intended to limit the spirit, scope or intent of the invention.

In certain embodiments, a security analytics system 118, described in greater detail herein, may be implemented to include a risk-adaptive prevention system 120, a visual hacking detection system 122, or both. In certain embodiments, the security analytics system 118 may likewise be implemented to include repositories of security analytics data 682, user profile data 682, visual hacking image data 784, or a combination thereof. In certain embodiments, the risk-adaptive protection system 120 may be implemented to detect anomalous, abnormal, unexpected or malicious user behavior and adaptively respond to mitigate risk, as described in greater detail herein. In certain embodiments, the security analytics system 118 may be implemented to use the visual hacking detection system 122 to perform security analytics operations to detect an incident of visual hacking, likewise described in greater detail herein.

In certain embodiments, the security analytics system 118 may be implemented to monitor user behavior associated with a user, such as user 'A' 602 or user 'B' 672. In certain embodiments, the user behavior may be monitored during user/device 630, user/network 642, user/resource 648, user/user 670 interactions, or a combination thereof. In certain embodiments, the user/user 670 interactions may occur between a first user, such as user 'A' 602, and a second user, such as user 'B' 672. In certain embodiments, as described in greater detail herein, an endpoint agent 306 may be implemented on an endpoint device 304 to perform the user behavior monitoring. In various embodiments, the endpoint agent 306 may be implemented to use surveillance images 778 collected by a device camera 628 implemented with the endpoint device 304 to perform certain user behavior monitoring operations, as likewise described in greater detail herein.

In various embodiments, the endpoint agent 306 may be implemented to perform user behavior operations related to the detection of visual hacking only when certain content is being displayed within a UI of an endpoint device. As an example, user behavior operations related to the detection of visual hacking may not be performed when a user is simply browsing various websites. However, they may be performed whenever sensitive, confidential or proprietary content is being displayed within the UI of an associated endpoint device 304. In certain of these embodiments, the endpoint agent 306 may be implemented to determine when the device camera 628 is activated to capture surveillance images 778. In these embodiments, the determination of under what circumstances the device camera 628 is activated, and the manner in which it is implemented to capture surveillance images 778 during various user behavior operations, is a matter of design choice.

In certain embodiments, the user behavior may be monitored by the endpoint agent 306 during user/device 630 interactions between a user, such as user 'A' 602, and an endpoint device 304. In certain embodiments, the user behavior may be monitored by the endpoint agent 306 during user/network 642 interactions between user 'A' 602 or user 'B' 672, and a network, such as an internal 644 or external 646 network. In certain embodiments, the endpoint agent 306 may be implemented to perform the monitoring of user behavior in combination with the security analytics system 118, the risk-adaptive 120 module, and the visual hacking detection 122 module.

In certain embodiments, the endpoint agent 306 may be implemented in combination with the security analytics system 118, the risk-adaptive 120 module, and the visual hacking detection 122 module to detect anomalous, abnormal, unexpected or malicious user behavior associated with visual hacking and adaptively respond to mitigate risk. In these embodiments, the response to mitigate risk of visual hacking is matter of design choice. As an example, display of certain content within the User Interface (UI) of an endpoint device 304 may be blocked if an incident of visual hacking is detected. As another example, a user's associated risk score may be revised if an occurrence of visual hacking is detected.

In certain embodiments, the endpoint agent 306 may be implemented to include a visual hacking detection feature pack 708 and an analytics 310 module, described in greater detail herein. In certain embodiments, the visual hacking detection feature pack 708 may be implemented to include an event detector 710 module, a user behavior detector 712 module, and a surveillance image collector 714 module. In certain embodiments, the event detector 710 module may be implemented to detect event data, likewise described in greater detail herein, resulting from user/device 630, user/network 642, user/resource 648, and user/user 670 interactions. In certain embodiments, the user behavior detector 710 module may be implemented to detect user behavior data, described in greater detail herein, resulting from user/device 630, user/network 642, user/resource 648, and user/user 670 interactions.

In certain embodiments, the surveillance image data collector 714 module may be implemented to receive surveillance images 778 provided by the device camera 628. In certain embodiments, the surveillance images 778 may be in the form of one or more individual digital images. In certain embodiments, the individual digital images may be provided to the surveillance image data collector 714 in various file formats, such as Joint Photographic Experts Group (JPEG), Tagged Image File Format (TIFF), or the device camera's 628 native RAW file format.

In certain embodiments, the surveillance images 778 may be in the form of a video recording. In certain embodiments, the video recording may be provided to the surveillance image data collector 714 in the form of a continuous sequence of video frames. In certain embodiments, the surveillance image detector may be implemented to parse the continuous sequence of video frames into individual video frames. In certain embodiments, the continuous sequence of video frames may be collected by the surveillance image data collector 714 to provide full-motion video when played back. In certain embodiments, the video recording images may be provided to the surveillance image data collector 714 in the form of streaming media, familiar to those of skill in the art.

In certain embodiments, the video recording images may be provided to the surveillance image data collector 714 in the form of various video file formats. Examples of such video file formats familiar to skilled practitioners of the art include Audio Video Interleave (AVI), Windows Media Video (WMV), QuickTime, and various versions of the Motion Pictures Expert Group (MPEG), 3$^{rd}$ Generation Partnership Project (3GPP), and Flash video formats. In certain embodiments, the video recording images may be provided to the surveillance image data collector 714 in a non-continuous sequence of individual video frames. In certain embodiments, the rate at which the non-continuous sequence of individual video frames is collected from the device camera 628 is a matter of design choice.

In certain embodiments, the frequency with which the non-continuous sequence of individual video frames is collected may vary according to whether or not an incidence of visual hacking has been detected. As an example, the device camera 628 may be implemented to provide a single video frame per second until an incidence of visual hacking is detected. However, once detected, the rate at which the individual video frames are provided may then be increased to 30 frames a second. In certain embodiments, the device camera 628 may be implemented to provide surveillance images, regardless of the rate in which they are collected, for the duration of a detected occurrence of visual hacking. In these embodiments, the method by which the duration of a detected occurrence of visual hacking is determined is a matter of design choice. As an example, the video frame sampling frequency may be preconfigured (e.g., every 1,000 milliseconds) and overridden when an incident of visual hacking is detected.

In certain embodiments, the resolution of the surveillance images 778 images provided to the surveillance image data detector 714 by the device camera 628 is a matter of design choice. As an example, the device camera 628 may be implemented to provide the surveillance images 778 at a low resolution during the performance of certain visual hacking detection operations. However, the device camera 628 may likewise be implemented to increase the resolution of the surveillance images 778 once an incidence of visual hacking has been detected. To continue the example, the device camera 628 may be further implemented to provide the surveillance images 778 at high resolution during the occurrence of a visual hacking incident and then return to a lower resolution once the visual hacking incident is no longer occurring.

In certain embodiments, the surveillance image data collector 714 module may be implemented to process the collected surveillance images 778 to generate surveillance image data corresponding to certain user/device 630, user/network 642, user/resource 648, and user/user 670 interactions. In certain embodiments, the visual hacking detection feature pack 708 may be implemented to process the resulting surveillance image data with associated event data and user behavior data to generate a stream of event data, described in greater detail herein. In certain embodiments, the endpoint agent 306 may be implemented to communicate the resulting stream of event data to the security analytics 118 system.

In certain embodiments, the visual hacking detection feature pack 708 may be implemented to include a risk-adaptive security policy 716. As used herein, a risk-adaptive security policy 716 broadly refers to a security policy implemented to be revised by the security analytics system 118 to adaptively remediate risk associated with certain user behaviors. In certain embodiments, such revisions to the risk-adaptive security policy 716 may be performed by the risk-adaptive protection 120 module. In certain embodiments, revisions to the risk-adaptive security policy 714 may be made in response to the detection of anomalous, abnormal, unexpected or malicious user behavior associated with visual hacking.

In certain embodiments, the risk-adaptive prevention 120 module may be implemented to assess the risk of revising one or more rules, or actions, associated with a risk-adaptive security policy 714. In certain embodiments, the determination of whether the assessed risk is acceptable is a matter of design choice. In certain embodiments, the determination may be made automatically, semi-automatically, or manually. As an example, the risk-adaptive prevention 120 module may be implemented to determine whether the assessed risk is within a particular risk range, or within certain security operational parameters, and if so, automatically decide the assessed risk is acceptable. As another example, the risk-adaptive prevention 120 module may be implemented to notify a security administrator 668 of the assessed risk. In this example, the security administrator 668 may decide whether or not the assessed risk is acceptable.

In certain embodiments, the visual hacking detection 122 module may be implemented to include a user behavior element generator 782 sub-module, a user profile generator 784 sub-module, and a surveillance image comparator 786 sub-module. In certain embodiments, the visual hacking detection 122 module may likewise be implemented to include a computer vision machine learning 788 sub-module and a surveillance image correlator 790 sub-module. In certain embodiments, the user behavior element generator 782 sub-module may be implemented to process the stream of event data provided by the endpoint agent 306 to generate user behavior elements, described in greater detail herein.

In certain embodiments, the user profile generator 784 sub-module may be implemented to process the stream of event data provided by the endpoint agent 306 and the user behavior elements generated by the user behavior element generator 782 sub-module to generate a user profile, likewise described in greater detail herein. In certain embodiments, the user profile generator 784 sub-module may be implemented to append the user behavior elements generated by the user behavior generator 782 sub-module to an existing user profile. In certain embodiments, the resulting user profiles may be stored in the repository of user profile data 682.

In various embodiments, certain user behavior elements generated by the user behavior element generator 782 sub-module may include surveillance image data. In certain embodiments, the resulting user behavior elements, or the surveillance image data they may contain, or a combination thereof, may be stored in a repository of visual hacking image data 784. In certain embodiments, the surveillance image comparator 786 sub-module may be implemented to process such user behavior elements to detect incidents of visual hacking. In certain embodiments, the surveillance image comparator 786 sub-module may be implemented to perform such detection by comparing user behavior elements containing surveillance image data to existing surveillance images stored in the repository of visual hacking image data 784.

In certain embodiments, the surveillance image comparator 786 sub-module may be implemented to use various computer vision approaches familiar to skilled practitioners of the art to perform the comparison of user behavior elements containing surveillance image data. As used herein, computer vision broadly refers to the interdisciplinary field of using various computing devices to gain a high-level understanding from digital images or videos. In typical implementations, computer vision seeks to replicate how a human processes visual information through automated extraction, analysis and understanding of image data corresponding to individual, or sequences of, digital images. In certain embodiments, such image data may include individual, or sequences of, video frames provided by a device camera 628, or views from multiple cameras, such as surveillance cameras, as described in greater detail herein.

In certain embodiments, various computer vision approaches used by the surveillance image comparator 786 sub-module may result in determining whether surveillance image data contained in a particular user behavior element depicts a possible occurrence of visual hacking. In certain embodiments, the depiction of such a possible occurrence of visual hacking may be a true positive, a false positive, a true negative, a false negative, or indeterminate. As used herein, as it relates to the detection of visual hacking, a true positive broadly refers to a correct conclusion resulting from correctly identifying the presence of one or more indicators of the occurrence of visual hacking within a set of surveillance image data. As likewise used herein, as it relates to the detection of visual hacking, a false positive broadly refers to an incorrect conclusion resulting from incorrectly identifying the presence of one or more indicators of the occurrence of visual hacking within a set of surveillance image data.

Likewise, as used herein, and as it relates to the detection of visual hacking, a true negative broadly refers to a correct conclusion resulting from correctly identifying the absence of one or more indicators of the occurrence of visual hacking within a set of surveillance image data. A false negative, as likewise used herein, and as it relates to the detection of visual hacking, broadly refers to an incorrect conclusion resulting from failing to identify one or more indicators of the occurrence of visual hacking within a set of surveillance image data. As likewise used herein, and as it relates to the detection of visual hacking, an indeterminate depiction of the occurrence of visual hacking broadly refers to an inconclusive conclusion resulting from being unable to discern whether or not a visual hacking incident occurred. In certain embodiments, a false positive, false negative, or indeterminate depiction, may be generated as a result of the defined bounds of a risk-adaptive security policy's 716 associated rule being met or exceeded as a result the occurrence of a legitimate event, the enactment of a legitimate behavior, or a combination thereof.

In various embodiments, certain machine learning approaches familiar to those of skill in the art may be implemented to train the computer vision machine learning 788 sub-module to recognize a true positive, a false positive, a true negative, a false negative, or indeterminate occurrence of visual hacking. In certain embodiments, the machine learning approaches may include supervised learning approaches, unsupervised learning approaches, or a combination thereof. As used herein, supervised learning broadly refers to a machine learning approach for inferring a function from labeled training data. The training data typically consists of a set of training examples, with each example consisting of an input object (e.g., a vector) and a desired output value (e.g., a supervisory signal). In certain embodiments, a supervised learning algorithm may be implemented to analyze the training data and produce an inferred function, which in turn can be used for mapping new examples.

As likewise used herein, unsupervised learning broadly refers to a machine learning approach for finding non-obvious or hidden structures within a set of unlabeled data. In certain embodiments, an unsupervised machine learning algorithm is not given a set of training examples. Instead, it attempts to summarize and explain key features of the data it processes. Examples of unsupervised learning approaches include clustering (e.g., k-means, mixture models, hierarchical clustering, etc.) and latent variable models (e.g., expectation-maximization algorithms, method of moments, blind signal separation techniques, etc.).

In various embodiments, certain visual hacking image data stored in the repository of visual hacking image data 784, surveillance image data contained in various user behavior elements, or a combination thereof, may be used to train the computer vision machine learning 788 sub-module. In various embodiments, certain visual hacking image data stored in the repository of visual hacking image data 784 may be used to initially train the computer vision machine learning 788 sub-module and surveillance image data contained in various user behavior elements may subsequently be used to adjust the training. In various embodiments, certain visual hacking image data stored in the repository of visual hacking image data 784, surveillance image data contained in various user behavior elements, or a combination thereof, may be used to train the computer vision machine learning 788 sub-module to recognize facial feature differences between two users, such as user 'A' 602 and user 'B' 672.

Current examples of machine learning approaches that may be used to perform the training of the computer vision machine learning 788 sub-module include Java® Open-Imaj®, produced by Oracle, of Redwood Shores, Calif., and Python TensorFlow, provided under open source licensing by the non-profit Python Software Foundation. In certain embodiments, these same approaches may be implemented to classify surveillance images 778 provided by the surveillance image collector 714. In these embodiments, the method by which the surveillance images 778 are classified, and the classes used to classify them, is a matter of design choice.

For example, an image of a user, such as user 'A' 602 or 'B' 672 holding a user camera 728 can be detected by the computer vision machine learning 788 sub-module after it has been trained on a folder containing many such images. Likewise, such approaches may be implemented in various embodiments to train the computer vision machine learning 788 sub-module to recognize a user camera 728 being held in a posture indicating that it is being used to capture an image of content being displayed within a UI of an endpoint device 304. In this example, images of users simply holding a user camera 728 may be classified as "true negatives" and stored in a first folder, while images of users holding a user camera 728 in a posture indicting that it is being used to capture content displayed within a UI may be classified as "true positives" and stored in a second folder.

Certain embodiments of the invention reflect an appreciation that surveillance images 778 provided to the security analytics system 118 by the surveillance image collector 714 should be analyzed as quickly as possible so the display of content within the UI of an endpoint device 304 can be blocked before a user has the opportunity to capture an image of it with a user camera 728. Rapid detection of the use of a user camera 728 within a surveillance image 628 corresponding to an incidence of visual hacking may be achieved in certain embodiments through the implementation of various deep neural network approaches familiar to skilled practitioners of the art.

An example of such a deep neural network approach includes Inception-V3, which is typically implemented in combination with Python TensorFlow to take certain extracted features in image data and use it as input to a Support Vector Machine (SVM) classifier. Those of skill in the art will be familiar with such approaches, which are typically considered to be a form of transfer learning, in which deep learning is achieved by using a large training dataset for generality while adapting it for recognition of certain features. In certain embodiments, various libraries may be implemented with Python to perform surveillance image 778 analysis, including TensorFlow to perform feature extraction via Inception-V3, scikits.learn (SKLearn), and OpenCV, an API to a fast image processing library.

In certain embodiments, the computer vision machine learning 788 sub-module may be trained, as described in greater detail herein, to detect an incidence of a user, such as user 'A' 602 or 'B' 672, attempting to use a user camera 728 to capture an image of content displayed within a UI of an endpoint device 304. In certain embodiments, borderline matches from a "true positive" training set of surveillance image data may be removed to decrease the number of "false negatives" detected by the surveillance image comparator 786 sub-module. In certain embodiments, "false positive" surveillance image data may be added to a "true negative" training set of surveillance image data to decrease the number of "false positives" detected by the surveillance image comparator 786 sub-module.

In certain embodiments, a compromise in the number of "false negatives" may be allowed due to consecutive surveillance images 778 eventually leading to the detection of a "true positive" by the surveillance image comparator 786 sub-module. As an example, a user may be detected in an initial analyzed surveillance image 778 with a corresponding user camera 728 in a low position, which results in the detection of a "false negative." However, the user camera 728 may then be detected in a higher position in a subsequent analyzed surveillance image 778, resulting in the detection of a "true positive."

In certain embodiments, the computer vision machine learning 788 sub-module may be implemented in combination with the surveillance image correlator 790 sub-module to perform facial recognition operations familiar to skilled practitioners of the art. In certain embodiments, the facial recognition operations may be performed to determine the difference between two users, such as user 'A' 602 and user 'B' 672, whose facial features may have been captured in different sets of surveillance images 778. In certain embodiments, the results of the facial recognition operations may be used detect the occurrence of a visual hacking incident. As an example, user 'A' 602 may be authorized to view certain content displayed within the UI of an endpoint device 304, while user 'B' 672 is not. Accordingly, the performance of facial recognition operations may allow user 'A' 602 to view the content, but prevent user 'B' 672 from doing so.

In various embodiments, certain risk-adaptive protection operations, described in greater detail herein, may be performed by the risk-adaptive prevention 120 module in response to detection of an occurrence of visual hacking and adaptively respond to mitigate associated risk. As an example, the security analytics system 118 may be notified if the device camera 628 is disabled or otherwise prevented from providing surveillance images 778. As a result, the risk-adaptive prevention system 120 may be implemented to prevent the display of sensitive, confidential, or proprietary content within the UI of its associated endpoint device 304. Likewise, the risk-adaptive prevention system 120 may further be implemented to update various rules associated with the risk-adaptive security policy 716 to prevent the display of sensitive, confidential, or proprietary content within the UI of its associated endpoint device 304 until the device camera 628 is operational again. Furthermore, the risk-adaptive prevention system 120 may likewise be implemented to notify a security administrator 668 of the risk-adaptive measures it has enacted.

In certain embodiments, the risk-adaptive protection operations may include detecting when a different user, such as user 'B' 672, is viewing content displayed within the UI of an endpoint device 304 typically associated with another user, such as user 'A' 602. For example, in certain embodiments, a first user behavior element containing a first set of surveillance image data is compared to a second user behavior element containing a second set of surveillance image data to determine whether the two users are the same. If not, then a corresponding risk-adaptive response is enacted. In certain embodiments, the comparison between the two sets of surveillance image data may be performed by the surveillance image comparator 786 sub-module. In these embodiments, the method by which it is determined whether the two users are the same is a matter of design choice.

In various embodiments, the risk-adaptive protection operations may include correlating the detection of an occurrence of visual hacking to certain identity resolution information, user behavior information, temporal information, or a combination thereof. In certain embodiments, the correlation may include correlating the content displayed within the UI of an endpoint device 304, one or more surveillance images 778 associated with the detection of the occurrence of visual hacking, and associated identity resolution, user behavior, and temporal information. In certain embodiments, the surveillance image correlator 790 sub-module may be implemented to perform such correlation.

FIGS. 8a through 8d show examples of surveillance images associated with the performance of visual hacking detection operations implemented in accordance with an embodiment of the invention. In certain embodiments, a device camera associated with an endpoint device, such as a camera integrated into a mobile device, may be implemented to collect surveillance images, which in turn are processed to detect the occurrence of visual hacking, as described in greater detail herein. In certain embodiments, the surveillance images may include the use of a user camera by an associated user to perform the visual hacking. In various embodiments, the performance of certain visual hacking detection operations may result in a "true positive," "false positive," "true negative," "false negative," or "indeterminate detection of an occurrence of visual hacking, as likewise described in greater detail herein.

Figure 8B:
FIGS. 8a through 8d show examples of surveillance images associated with the performance of visual hacking detection operations.
Figure 8D:
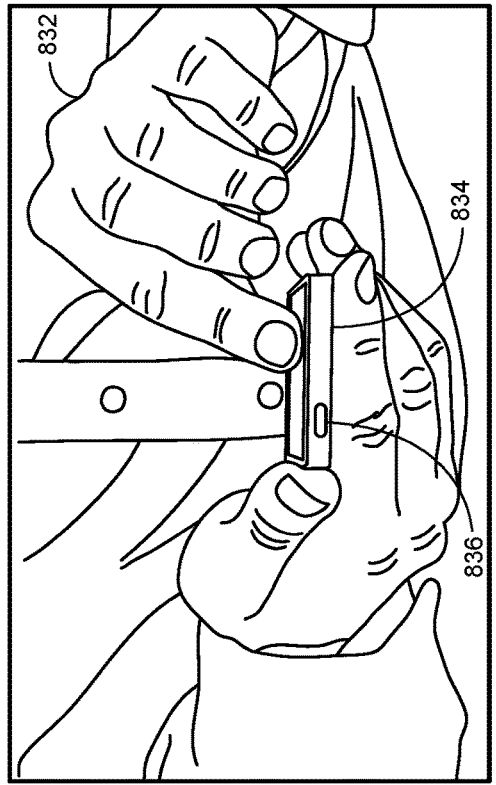
Figure 8A:

As an example, the surveillance image shown in FIG. 8a depicts a user 802 holding a user camera 804 such that its lens 806 is pointed towards a device camera implemented to collect surveillance images. Accordingly, the surveillance image shown in FIG. 8a would be considered a "true positive" detection of an occurrence of visual hacking. As another example, the surveillance image shown in FIG. 8b depicts a user 812 holding a user camera 814 such that its lens 816 is pointed away from a device camera implemented to collect surveillance images. Accordingly, the surveillance image shown in FIG. 8b would be considered a "true negative" detection of an occurrence of visual hacking.

Figure 8C:
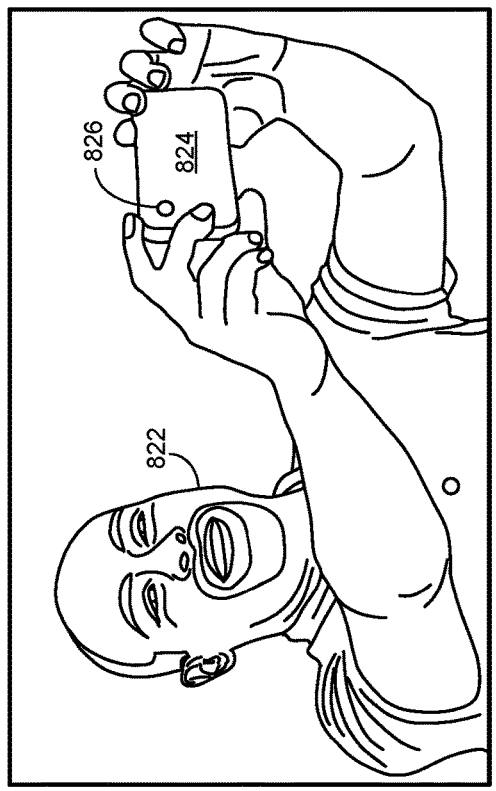

As yet another example, the surveillance image shown in FIG. 8c depicts a user 822 holding a user camera 824 such that its lens 826 is somewhat pointed towards a device camera implemented to collect surveillance images. Accordingly, the surveillance image shown in FIG. 8c would be considered a "false positive" detection of the occurrence of visual hacking. As yet still another example, the surveillance image shown in FIG. 8d depicts a user 832 holding a user camera 834 such that its lens 836 is pointed towards a device camera implemented to collect surveillance images. In this example, it will be appreciated that a lens of a camera is typically not implemented on its edge, but it is still possible. Accordingly, the surveillance image shown in FIG. 8a would be considered a "false negative" detection of the occurrence of visual hacking, as the lens of the camera was not detected as being pointed towards the device camera that collected the surveillance image.

Figure 9:
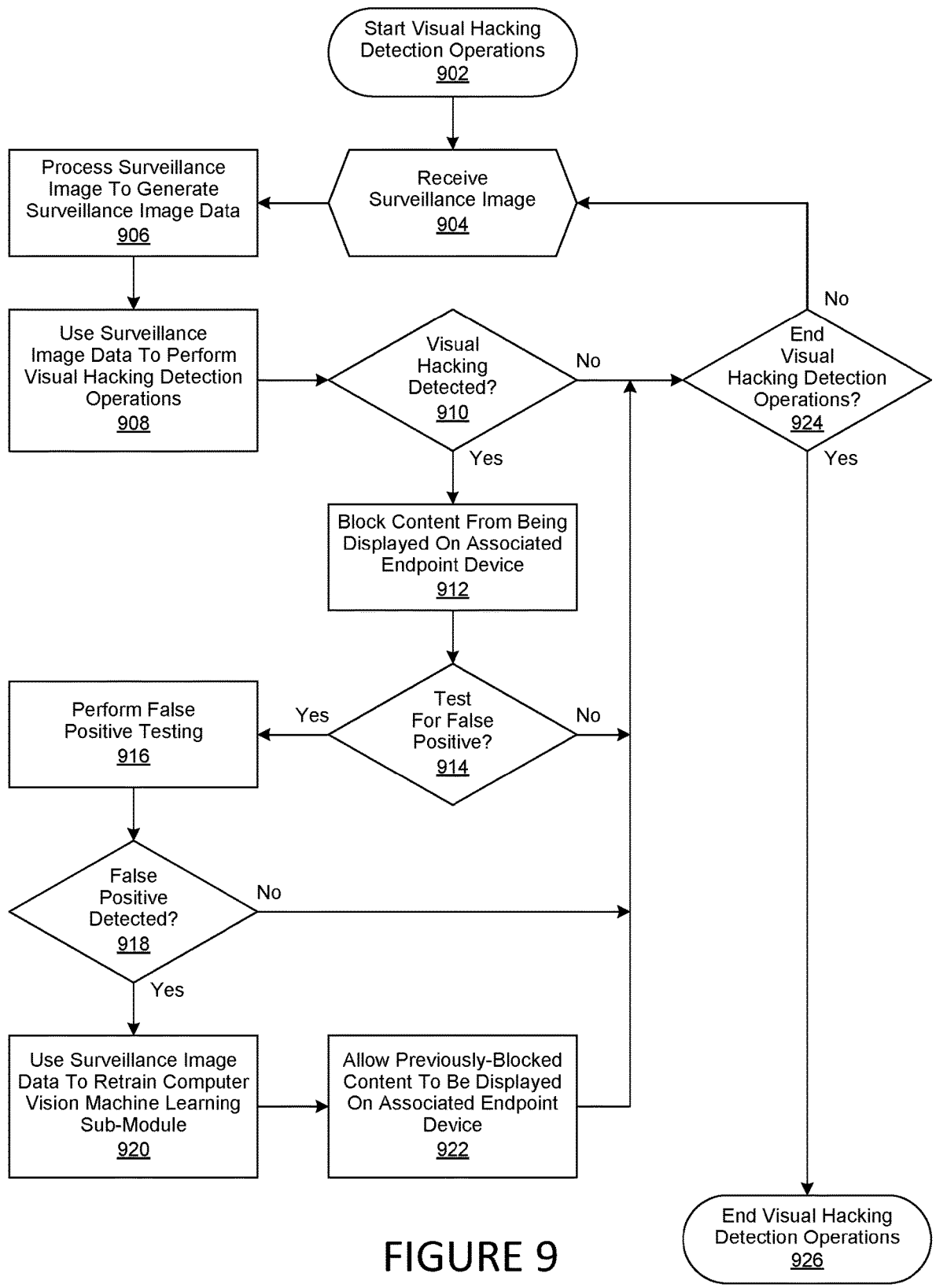
FIG. 9 is a generalized flowchart of the performance of visual hacking detection operations.

FIG. 9 is a generalized flowchart of the performance of visual hacking detection operations implemented in accordance with an embodiment of the invention. In this embodiment, visual hacking detection operations are begun in step 902, followed by ongoing operations being performed in step 904 to receive a surveillance image, described in greater detail herein. As each surveillance image is received in step 904, it is processed in step 906 to generate corresponding surveillance image data, which is then used in step 908 to perform visual hacking detection operations, likewise described in greater detail herein.

A determination is then made in step 910 whether a visual hacking incidence has occurred. If so, then content is blocked from being displayed on the endpoint device associated with the device camera that provided the surveillance image at step 912. A determination is then made in step 914 whether to test the surveillance image data for being a false positive detection of visual hacking. If so, then the false positive testing is performed in step 916, followed by a determination being made in step 918 whether the detected occurrence of visual hacking was a false positive. If so, then the surveillance image data is used in step 920 to retrain a computer vision machine learning module, described in greater detail herein.

The previously-blocked content is then allowed to be displayed on the endpoint device in step 922. Thereafter, or if it was determined in step 914 to not test the surveillance imaged data for being a false positive, or if it was determined in step 918 that a false positive was not detected, then a determination is made in step 924 whether to end visual hacking detection operations. If not, then the process is continued, proceeding with step 904. Otherwise, visual hacking detection operations are ended in step 926.

Figure 10:
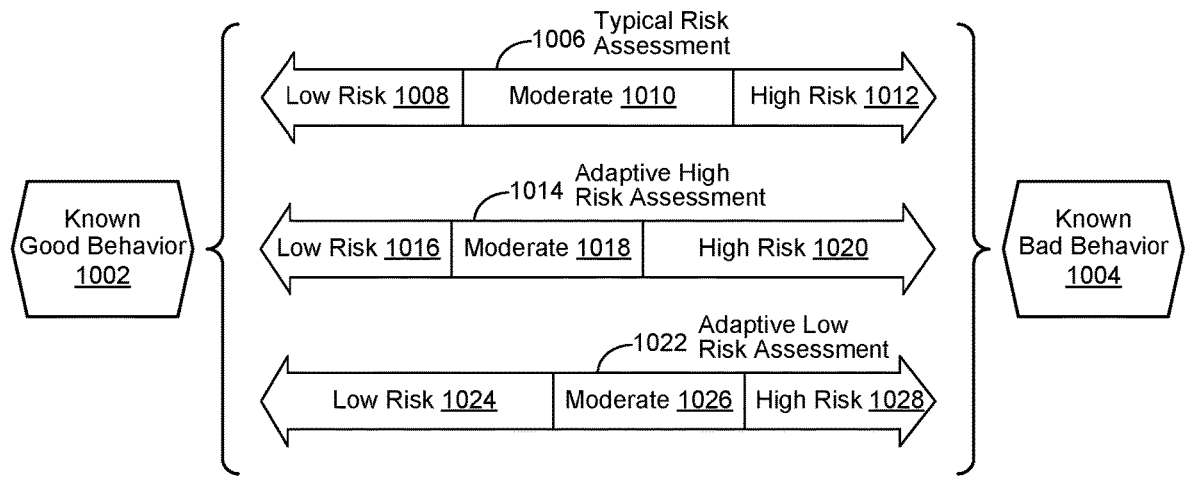
FIG. 10 is a simplified block diagram of the operation of a security analytics system implemented to adaptively assess risk associated with a user behavior.

FIG. 10 is a simplified block diagram of the operation of a security analytics system implemented in accordance with an embodiment of the invention to adaptively assess risk associated with a user behavior. In this embodiment, the user behavior is monitored and compared to known good behavior 1002 and known bad behavior 1004. In typical risk assessment 1006 approaches, low 1008, moderate 1010, or high 1012 risk user behavior is generally determined by using fairly inflexible security policies, which are typically used to enact relatively static responses.

As an example, a security policy implemented for access control may have a list of actions a particular user can do and a list of things they cannot. Ordinarily, the actions in those lists are static and don't change, regardless of the particular user behavior being enacted by the user. However, perhaps they should change, or adapt, if it is determined the user behavior being enacted by the user has changed, and as a result, represents a higher risk.

To continue the example, a user may be perusing various resources and happens to access a webpage, such as a shopping site, that contains certain objects. Typical security approaches assume some portion of those objects to be good, a small number are known to be bad, and the remainder suspicious. Consequently, there is a continuum of objects, some assumed to be good, some undetermined, and the rest known to be bad. It will be appreciated that the determination of what is considered to be good, undetermined or bad is oftentimes fairly arbitrary.

In certain embodiments, contextual information associated with the user behavior being enacted by the user is collected and processed to adaptively respond to changes in the user's current user behavior. In continuance of the example, the user may change their user behavior to access internal business resources. In this example, accessing internal business resources is contextual information that may represent the potential for higher risk. As a result, a risk-adaptive behavior system may be implemented in certain embodiments to respond with an adaptive high risk assessment 1014. In certain embodiments, the adaptive high risk assessment 1014 is generated by a security analytics system, described in greater detail herein. Consequently, the adaptive high risk assessment 1014 may indicate a larger percentage of certain user behavior as high 1020 risk, and a smaller percentage as low 1016 or moderate 1018 risk.

In further continuance of the example, the user may further change their user behavior to access an external news site. As before, the user's access of an external news site is contextual information that may represent the likelihood of lower risk. As a result, the risk-adaptive behavior system may be implemented to respond with an adaptive low risk assessment 1022, which may indicate a larger percentage of certain user behavior as low 1024 risk, and a smaller percentage as moderate 1026 or high 1028 risk.

Certain embodiments of the invention reflect an appreciation that without the described adaptive behavior, the operational overhead administering user security would be high, as all user interactions related to their user behavior would continue to be monitored. However, the cost of administering user security would decrease when the user was no longer interacting with internal resources. Consequently, risk tolerance can be dynamically adjusted according to the context of a given user activity.

More particularly, if the user's activity is primarily internal to the organization, then some risk can be tolerated. However, if the user's activity is primarily external to the organization, then it is possible that essentially all risk can be tolerated. Furthermore, the user experience may be more pleasant during non-organization activities, as fewer security controls may be applied or experienced. Moreover, the risk assessment becomes dynamic, according to the identity of the user, the resources being accessed, their respective user behavior, and corresponding points of observation.

Figure 11:
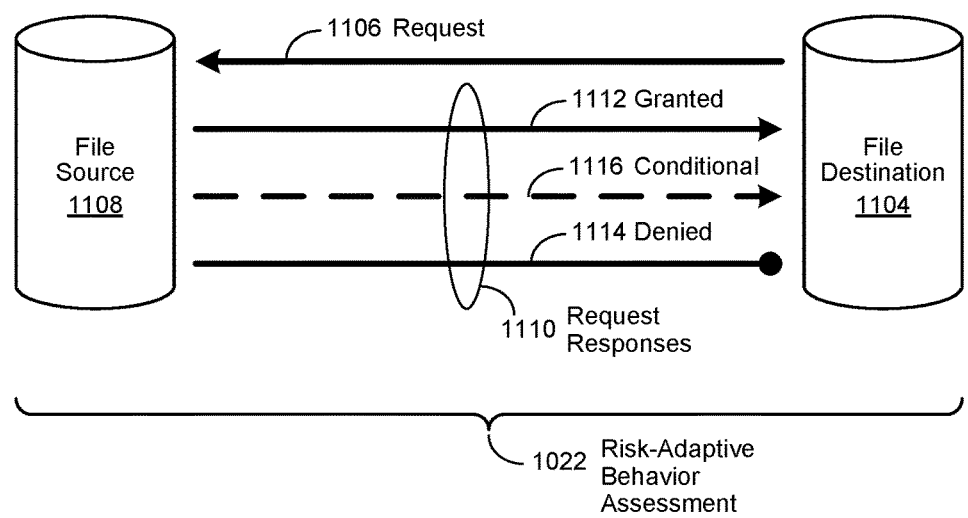
FIG. 11 is a simplified block diagram of the operation of a security analytics system implemented to adaptively respond to a user request.

FIG. 11 is a simplified block diagram of the operation of a security analytics system implemented in accordance with an embodiment of the invention to adaptively respond to a user request. In this embodiment, a user may place a request 1106 to download a file from a file source 1108 to a file destination 1104, such as a USB drive. In traditional security approaches, the owner of the requested file may have a single security rule, which would be a granted 1112, or denied 1114, request response 1110 as to whether the user was allowed to download the file.

In certain embodiments, a risk-adaptive security policy, as described in greater detail herein, may be implemented such that the user's request 1106 to download the requested file is typically granted 1112. However, the user may have recently updated their online resume, begun taking random days off, as well as caught taking pictures of content displayed by an endpoint device, which may imply a flight risk. By extension, the user behavior and other actions associated with the user may likewise imply the user's intent to take proprietary information with them to a new job. Consequently, various risk-adaptive behavior approaches, described in greater detail herein, may yield a denied 1114 request response 1110 due to the associated context of their user behavior, other actions, or a combination thereof.

Alternatively, a risk-adaptive security policy may be implemented in various embodiments to provide a conditional 1116 request response 1110. As an example, the requested file may be encrypted such that it can only be opened on a corporate computer. Furthermore, attempting to open the file on a non-corporate computer may result in a message being sent to a security administrator. Likewise, a single file being downloaded may appear as good behavior, yet multiple sequential downloads may appear suspicious, especially if the files do not appear to be related, or possibly, if they do. From the foregoing, it will be appreciated that risk-adaptive behavior is not necessarily based upon an atomic action, but rather a multiplicity of factors, such as contextual information associated with particular user behavior.

Figure 12:
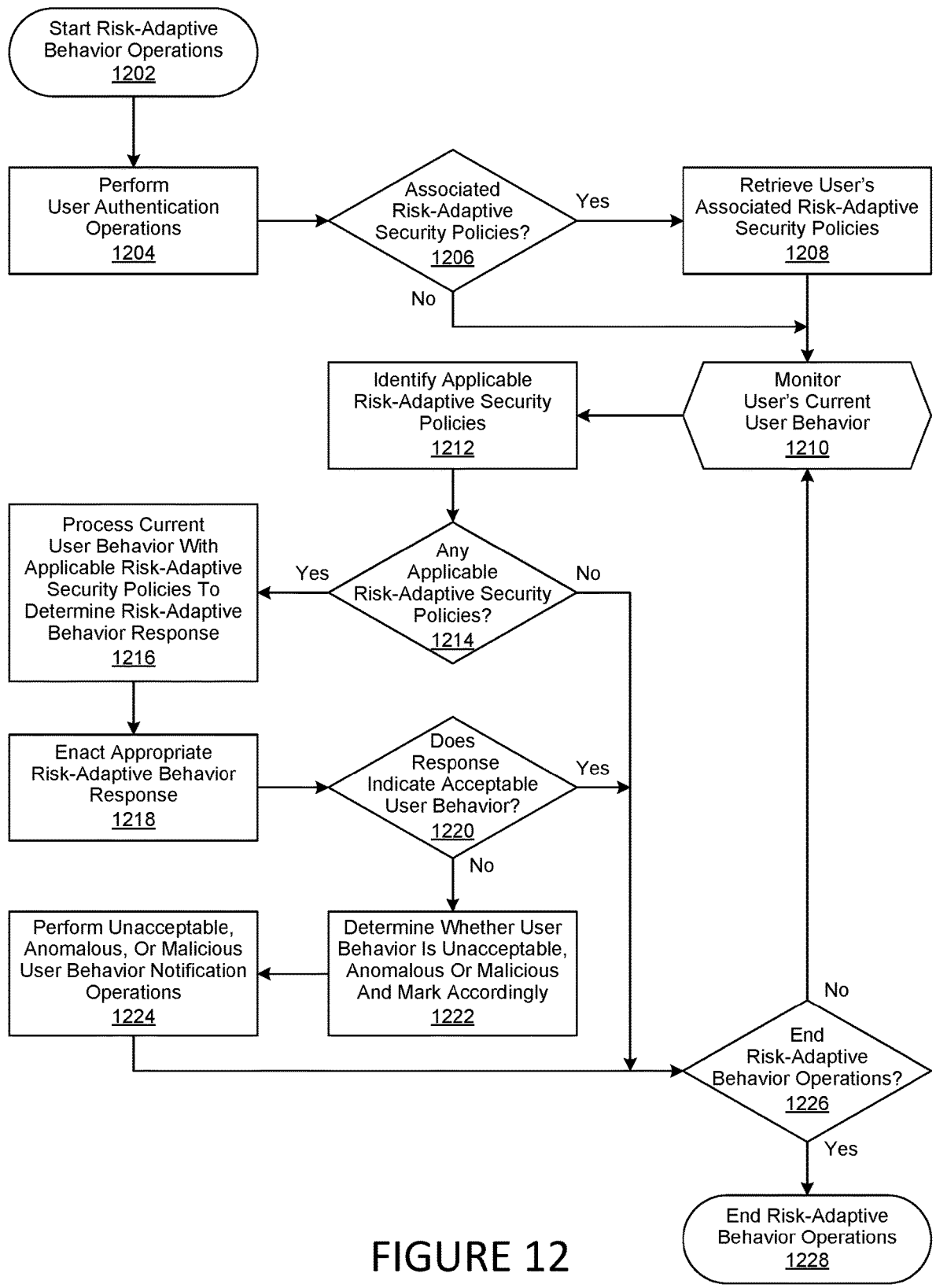
FIG. 12 a generalized flowchart of the performance of security analytics system operations for adaptively managing user behavior risk.

FIG. 12 is a generalized flowchart of the performance of security analytics system operations implemented in accordance with an embodiment of the invention to adaptively manage user behavior risk. In this embodiment, risk-adaptive behavior operations are begun in step 1202, followed by the performance of user authentication operations, familiar to those of skill in the art, in step 1204. A determination is then made in step 1206 whether the user has one or more associated risk-adaptive security policies. If so, then they are retrieved for use in step 1208. Thereafter, or if it was determined in step 1206 the user has no associated risk-adaptive security policies, the user's user behavior is monitored in step 1210.

The user's current user behavior is then processed in step 1212 to identify any applicable risk-adaptive security policies that may apply. A determination is then made in step 1214 whether any applicable risk-adaptive security policies have been identified. If not, a determination is made in step 1226 whether to end risk-adaptive behavior system operations. If not, then the process is continued, proceeding with step 1210. Otherwise, risk-adaptive behavior system operations are ended in step 1228.

However, if it is determined in step 1214 that one or more applicable risk-adaptive security policies have been identified, then they are used in step 1216 to process the user's current user behavior to determine an appropriate risk-adaptive behavior response. The appropriate risk-adaptive behavior response is then enacted in step 1218, followed by a determination being made in step 1220 whether the risk-adaptive behavior response enacted in step 1218 indicates acceptable user behavior.

If so, then the process is continued, proceeding with step 1226. Otherwise the user's current user behavior is determined to be unacceptable, anomalous, or malicious and marked accordingly in step 1222. Unacceptable, anomalous, or malicious user behavior notification operations are then performed in step 1224. In one embodiment, the unacceptable, anomalous, or malicious user behavior is stored for later review. In another embodiment, a security administrator is notified of the unacceptable, anomalous, or malicious user behavior. Thereafter, the process is continued, proceeding with step 1226 with a determination of whether to end risk-adaptive behavior operations. Risk-adaptive behavior operations are then ended with step 1228.

Figure 13:
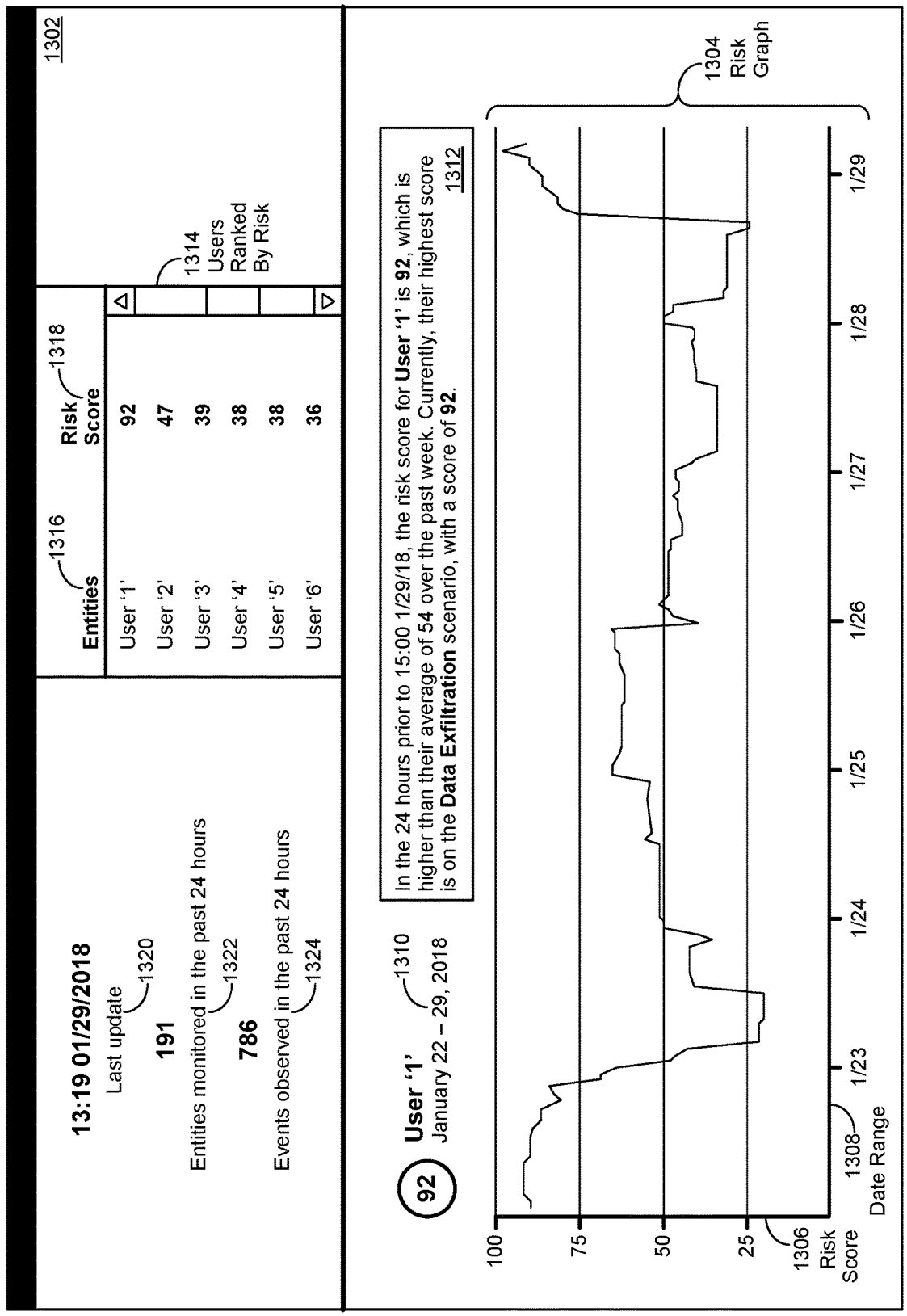
FIG. 13 shows an example screen presentation of a security analytics system user interface.

FIG. 13 shows the operation of a security analytics system within a user interface implemented in accordance with an embodiment of the invention. In this embodiment, a risk graph 1304 displayed within a user interface (UI) window 1302 depicts the fluctuation of risk scores 1306 at different points in time within a particular date range 1308. In certain embodiments, the fluctuation of risk scores 1306 displayed within the risk graph 1304 corresponds to the potential risk associated with a particular user 1310 at various points in time within the date range 1308. In certain embodiments, a risk details window 1312 corresponding to the user 1310 may be displayed within the UI window 1302.

In certain embodiments, summary information may likewise be displayed within the UI window 1302. For example, as shown in FIG. 13, the last update 1320 of the risk graph 1304, the number of entities 1322 monitored in the last 24 hours, and the number of events 1324 observed in the last 24 hours may be displayed. In certain embodiments, individual entities 1316 being monitored, and their associated risk scores 1318, may be displayed in ranked order 1314 by their corresponding risk scores within the UI window 1302.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for detecting visual hacking comprising:
    receiving a surveillance image from a protected endpoint, the protected endpoint comprising an endpoint device and an endpoint agent, the endpoint agent monitoring user behavior during user/device interactions;
    processing the surveillance image to generate surveillance image data;
    performing a visual hacking detection operation using the surveillance image data, the visual hacking detection operation determining whether visual hacking has been detected, the visual hacking comprising an act of illicitly collecting confidential information from the protected endpoint by visual means, the visual hacking comprising recording the confidential information by an unauthorized user without knowledge of an authorized user; and,
    performing a risk-adaptive protection operation when visual hacking has been detected, the risk-adaptive operation being performed by a security analytics system, the security analytics system receiving a stream of event data, the risk-adaptive protection operation adaptively responding to mitigate risk associated with the visual hacking; and wherein
    the visual hacking comprises illicitly capturing of an image of sensitive, confidential or private information from the endpoint device of the authorized user by the unauthorized user;
    the surveillance image data contains content showing the capturing of the image of sensitive, confidential or private information from the endpoint device by the unauthorized user; and,
    the content showing the capturing of the image is processed with associated event data to generate the stream of event data.

2. The method of claim 1, further comprising:
    blocking content from being displayed on the endpoint device.

3. The method of claim 1, wherein:
    the visual hacking detection operation results in one of a true positive determination, a false positive determination, a true negative determination, a false negative determination and an indeterminate determination.

4. The method of claim 1, wherein:

the risk-adaptive protection operation interacts with a risk-adaptive security policy, the risk-adaptive security policy comprising a security policy implemented to be revised by the security analytics system to adaptively remediate risk when performing the visual hacking detection operation.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving a surveillance image from a protected endpoint, the protected endpoint comprising an endpoint device and an endpoint agent, the endpoint agent monitoring user behavior during user/device interactions;
processing the surveillance image to generate surveillance image data;
performing a visual hacking detection operation using the surveillance image data, the visual hacking detection operation determining whether visual hacking has been detected, the visual hacking comprising an act of illicitly collecting confidential information from the protected endpoint by visual means, the visual hacking comprising recording the confidential information by an unauthorized user without knowledge of an authorized user;
performing a risk-adaptive protection operation when visual hacking has been detected, the risk-adaptive operation being performed by a security analytics system, the security analytics system receiving a stream of event data, the risk-adaptive protection operation adaptively responding to mitigate risk associated with the visual hacking; and wherein
the visual hacking comprises illicitly capturing of an image of sensitive, confidential or private information from the endpoint device of the authorized user by the unauthorized user;
the surveillance image data contains content showing the capturing of the image of sensitive, confidential or private information from the endpoint device by the unauthorized user; and,
the content showing the capturing of the image is processed with associated event data to generate the stream of event data.

6. The system of claim 5, wherein the instructions are further configured for:
blocking content from being displayed on the endpoint device.

7. The system of claim 5, wherein:
the visual hacking detection operation results in one of a true positive determination, a false positive determination, a true negative determination, a false negative determination and an indeterminate determination.

8. The system of claim 5, wherein:
the risk-adaptive protection operation interacts with a risk-adaptive security policy, the risk-adaptive security policy comprising a security policy implemented to be revised by the security analytics system to adaptively remediate risk when performing the visual hacking detection operation.

9. A non-transitory, computer-readable storage medium embodying computer program code, the computer program code comprising computer executable instructions configured for:
receiving a surveillance image from a protected endpoint, the protected endpoint comprising an endpoint device and an endpoint agent, the endpoint agent monitoring user behavior during user/device interactions;
processing the surveillance image to generate surveillance image data;
performing a visual hacking detection operation using the surveillance image data, the visual hacking detection operation determining whether visual hacking has been detected, the visual hacking comprising an act of illicitly collecting confidential information from the protected endpoint by visual means, the visual hacking comprising recording the confidential information by an unauthorized user without knowledge of an authorized user;
performing a risk-adaptive protection operation when visual hacking has been detected, the risk-adaptive operation being performed by a security analytics system, the security analytics system receiving a stream of event data, the risk-adaptive protection operation adaptively responding to mitigate risk associated with the visual hacking; and wherein
the visual hacking comprises illicitly capturing of an image of sensitive, confidential or private information from the endpoint device of the authorized user by the unauthorized user;
the surveillance image data contains content showing the capturing of the image of sensitive, confidential or private information from the endpoint device by the unauthorized user; and,
the content showing the capturing of the image is processed with associated event data to generate the stream of event data.

10. The non-transitory, computer-readable storage medium of claim 9, wherein the computer executable instructions are further configured for:
blocking content from being displayed on the endpoint device.

11. The non-transitory, computer-readable storage medium of claim 9, wherein:
the visual hacking detection operation results in one of a true positive determination, a false positive determination, a true negative determination, a false negative determination and an indeterminate determination.

12. The non-transitory, computer-readable storage medium of claim 9, wherein:
the risk-adaptive protection operation interacts with a risk-adaptive security policy, the risk-adaptive security policy comprising a security policy implemented to be revised by the security analytics system to adaptively remediate risk when performing the visual hacking detection operation.

13. The non-transitory, computer-readable storage medium of claim 9, wherein the computer executable instructions are deployable to a client system from a server system at a remote location.

14. The non-transitory, computer-readable storage medium of claim 9, wherein the computer executable instructions are provided by a service provider to a user on an on-demand basis.

* * * * *